(12) United States Patent
Ito et al.

(10) Patent No.: US 9,413,289 B2
(45) Date of Patent: Aug. 9, 2016

(54) PHOTOELECTRIC CONVERSION DEVICE

(75) Inventors: Yoshiaki Ito, Tokyo (JP); Kazuo Nishi, Kanagawa (JP); Kei Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1034 days.

(21) Appl. No.: 13/281,479

(22) Filed: Oct. 26, 2011

(65) Prior Publication Data

US 2012/0104862 A1    May 3, 2012

(30) Foreign Application Priority Data

Oct. 29, 2010 (JP) ................................ 2010-243017

(51) Int. Cl.
| | |
|---|---|
| *H02J 1/00* | (2006.01) |
| *H02J 3/00* | (2006.01) |
| *H02S 40/32* | (2014.01) |
| *H02J 1/10* | (2006.01) |
| *H02J 3/38* | (2006.01) |

(52) U.S. Cl.
CPC . *H02S 40/32* (2014.12); *H02J 1/10* (2013.01); *H02J 3/383* (2013.01); *Y02E 10/563* (2013.01); *Y10T 307/707* (2015.04)

(58) Field of Classification Search
CPC . Y02E 10/548; Y02E 10/545; H01L 31/0428; H01L 31/0687; H02J 3/383; H02J 1/10; H02S 40/32; Y10S 136/293
USPC .................. 307/43, 58, 82; 363/40, 109, 120; 323/906; 136/244, 249, 293
See application file for complete search history.

(56) References Cited

U.S. PATENT DOCUMENTS

| 7,126,053 B2 | 10/2006 | Kurokami et al. |
|---|---|---|
| 7,345,458 B2 | 3/2008 | Kanai et al. |
| 7,449,866 B2 * | 11/2008 | Kanai ...................... H02J 7/35 307/43 |
| 8,043,935 B2 | 10/2011 | Isaka et al. |
| 8,076,920 B1 * | 12/2011 | Melanson ........... H02M 1/4208 315/247 |
| 8,338,218 B2 | 12/2012 | Shimomura |
| 8,379,418 B2 * | 2/2013 | Falk ....................... H02M 1/36 323/906 |

(Continued)

FOREIGN PATENT DOCUMENTS

| EP | 1376706 A | 1/2004 |
|---|---|---|
| EP | 1643611 A | 4/2006 |

(Continued)

*Primary Examiner* — Rexford Barnie
*Assistant Examiner* — Rasem Mourad
(74) *Attorney, Agent, or Firm* — Fish & Richardson P.C.

(57) ABSTRACT

A photoelectric conversion device includes at least two photoelectric conversion elements which have voltage-current characteristics different from each other. Further, one of the photoelectric conversion elements has photoelectric conversion efficiency higher than that of the other photoelectric conversion element under the environment in which room light can be obtained. Furthermore, the other photoelectric conversion element has photoelectric conversion efficiency higher than the one of the photoelectric conversion elements under the environment in which sunlight can be obtained. Moreover, each of the voltage of electric power generated in the at least two photoelectric conversion elements is adjusted by one of at least two DC-DC converters corresponding the photoelectric conversion element. In addition, part of the electric power generated in the one of the photoelectric conversion elements is used as drive electric power of the at least two DC-DC converter.

45 Claims, 12 Drawing Sheets

(56) References Cited

U.S. PATENT DOCUMENTS

| | | | |
|---|---|---|---|
| 2003/0234038 A1* | 12/2003 | Kurokami | H01L 31/0687 136/255 |
| 2005/0121067 A1* | 6/2005 | Toyomura | H01L 31/02021 136/244 |
| 2005/0265052 A1* | 12/2005 | Utsunomiya | 363/60 |
| 2005/0268957 A1* | 12/2005 | Enomoto | H01G 9/2031 136/244 |
| 2006/0132102 A1* | 6/2006 | Harvey | 320/166 |
| 2008/0062729 A1* | 3/2008 | Kanai | H02J 7/35 363/49 |
| 2009/0085409 A1* | 4/2009 | Kearney-Fischer | H02S 40/44 307/115 |
| 2009/0127555 A1* | 5/2009 | Yamazaki | H01L 31/02008 257/51 |
| 2009/0160259 A1* | 6/2009 | Naiknaware | H02M 7/4807 307/82 |
| 2009/0165854 A1 | 7/2009 | Yamazaki et al. | |
| 2009/0236917 A1* | 9/2009 | Bettenwort et al. | 307/82 |
| 2010/0047952 A1* | 2/2010 | Ohnuma et al. | 438/58 |
| 2010/0275990 A1 | 11/2010 | Shimomura et al. | |
| 2011/0032734 A1* | 2/2011 | Melanson | 363/37 |
| 2011/0041910 A1 | 2/2011 | Shimomura et al. | |
| 2011/0084553 A1* | 4/2011 | Adest | H02J 1/102 307/63 |
| 2011/0148835 A1 | 6/2011 | Yamazaki | |
| 2011/0303272 A1 | 12/2011 | Nishi et al. | |
| 2011/0315861 A1 | 12/2011 | Shima et al. | |
| 2012/0003787 A1 | 1/2012 | Tanaka et al. | |

FOREIGN PATENT DOCUMENTS

| | | |
|---|---|---|
| EP | 2806529 A | 11/2014 |
| EP | 2806530 A | 11/2014 |
| EP | 2806531 A | 11/2014 |
| JP | 63-204665 A | 8/1988 |
| JP | 01-128476 A | 5/1989 |
| JP | 2001-028452 A | 1/2001 |
| JP | 2003-204072 A | 7/2003 |
| JP | 2003-333757 A | 11/2003 |
| JP | 2004-079997 A | 3/2004 |
| WO | WO-2005/004304 | 1/2005 |

* cited by examiner

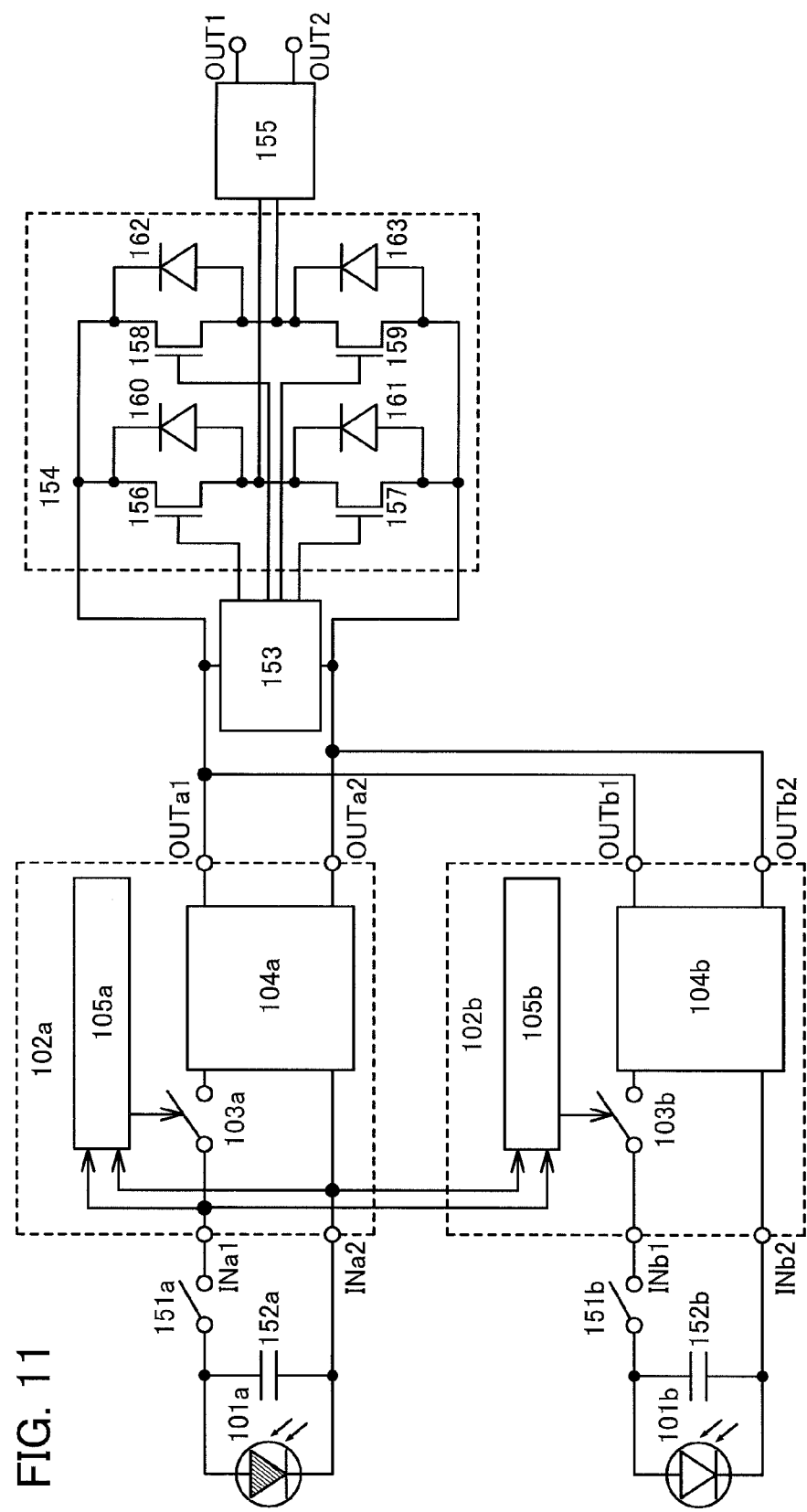

PHOTOELECTRIC CONVERSION DEVICE

BACKGROUND OF THE INVENTION

1. Field of the Invention

The present invention relates to a photoelectric conversion device that converts optical energy to electric energy and has a multiterminal structure.

2. Description of the Related Art

A photoelectric conversion device with the use of a semiconductor junction, such as a solar cell can be classified into a single junction type which has one semiconductor junction and a multi junction type which has a plurality of semiconductor junctions. A multi-junction photoelectric conversion device in which a plurality of semiconductor junctions whose band gaps are different from each other are arranged so as to overlap with each other in a direction of travel of light can convert sunlight including light with a wide wavelength range from ultraviolet rays to infrared rays into electrical energy with higher conversion efficiency without waste.

Note that when a multi-junction photoelectric conversion device has a two-terminal structure where stacked photoelectric conversion elements are connected in series, current flowing through all of the photoelectric conversion elements is determined in accordance with the photoelectric conversion element with the lowest short-circuit current. Thus, in the case where the photoelectric conversion elements have voltage-current characteristics different from each other, it is difficult to drive all of the photoelectric conversion elements at the respective maximum output points, at which the maximum output voltages can be output. On the other hand, even in the case of using a multi-junction photoelectric conversion device, when the multi-junction photoelectric conversion device has a multiterminal structure in which electric power is taken out from each of the photoelectric conversion elements that are not connected in series, each of the photoelectric conversion elements can be driven at the maximum output points. Accordingly, the multiterminal structure can achieve high photoelectric conversion efficiency of the whole photoelectric conversion device in comparison with the two-terminal structure.

Patent Document 1 discloses a power supply device in which a plurality of photoelectric conversion elements with different output characteristics from each other are stacked and the plurality of photoelectric conversion elements are connected in parallel through respective voltage regulator circuits.

REFERENCE

[Patent Document 1] Japanese Published Patent Application No. 2003-333757

SUMMARY OF THE INVENTION

As described in Patent Document 1, in a multiterminal photoelectric conversion device, a plurality of DC-DC converters are each provided for a corresponding terminal for taking out electric power in many cases. In that case, electric power output from each photoelectric conversion element is transmitted to the corresponding DC-DC converter. After that, the DC-DC converters adjust the voltage of the electric power and then output the voltage to loads.

Note that in the case of silicon, a photoelectric conversion element with a single crystal photoelectric conversion layer (hereinafter, referred to as a single crystal photoelectric conversion element) has very high photoelectric conversion efficiency under an environment in which light with large quantity of light such as sunlight can be obtained in comparison with a photoelectric conversion element with an amorphous photoelectric conversion layer (hereinafter, referred to as an amorphous photoelectric conversion element). On the contrary, although it depends on light wavelength, under an environment in which light with only small quantity of light such as room light can be obtained, the photoelectric conversion efficiency of the single crystal photoelectric conversion element is dramatically reduced and accordingly the single crystal photoelectric conversion element can generate only electric power lower than the amorphous photoelectric conversion element.

Note that drive electric power needed for driving the DC-DC converter is electric power input from the photoelectric conversion element to the DC-DC converter. That is to say, in the case where a single crystal photoelectric conversion element is used for a multiterminal photoelectric conversion device, the DC-DC converter which is connected in the sequent stage of the single crystal photoelectric conversion element is driven by electric power generated in the single crystal photoelectric conversion element. Accordingly, in the case where the multiterminal photoelectric conversion device is used under an environment in which light with only small quantity of light is obtained, it might be too low electric power which the single crystal photoelectric conversion element generates to normally drive the DC-DC converter in the sequent stage. When one DC-DC converter does not normally operate, the whole operation of the photoelectric conversion device is unstable; as a result, the photoelectric conversion device cannot be reliable.

In view of the above problem, an object of the present invention is to provide a multiterminal photoelectric conversion device in which high photoelectric conversion efficiency can be obtained in high illuminance and the operational reliability can be ensured in a wide illuminance range.

The present inventors have focused on the fact that in comparison with the photoelectric conversion efficiency of a single crystal photoelectric conversion element, the photoelectric conversion efficiency of an amorphous photoelectric conversion element is low under the high illuminance environment in which light with large quantity of light such as sunlight can be obtained but high under the low illuminance environment in which light with only small quantity of light such as room light can be obtained.

The photoelectric conversion efficiency of an amorphous photoelectric conversion element and the photoelectric conversion efficiency of a single crystal photoelectric conversion element are changed depending on the wavelength of room light. In the case of the room light with a wavelength of equal to or longer than 400 nm to equal to or shorter than 800 nm, the above-described tendency is generally shown. Such room light can be obtained from general artificial light sources such as a fluorescent lamp and an incandescent electric lamp. For the above reason, the present inventors have considered that even under the low illuminance environment, an amorphous photoelectric conversion element can generate not only drive electric power of a DC-DC converter for an amorphous photoelectric conversion element but also drive electric power of a DC-DC converter for a single crystal photoelectric conversion element.

A photoelectric conversion device according to an embodiment of the present invention includes at least two photoelectric conversion elements which have voltage-current characteristics different from each other. Further, one of the photoelectric conversion elements has photoelectric conversion efficiency higher than that of the other photoelectric conversion element under the environment in which room light can be obtained, like an amorphous photoelectric conversion element. Furthermore, the other photoelectric conversion element has photoelectric conversion efficiency higher than the one of the photoelectric conversion elements under the environment in which sunlight can be obtained, like a single crystal photoelectric conversion element. Moreover, each of the voltage of electric power generated in the at least two photoelectric conversion elements is adjusted by one of at least two DC-DC converters corresponding the photoelectric conversion element. In addition, part of the electric power generated in the one of the photoelectric conversion elements is used as drive electric power of the at least two DC-DC converter.

In an embodiment of the present invention, with the above structure, the drive electric power of a plurality of DC-DC converters can be ensured even under the low illuminance environment obtained by room light and high photoelectric conversion efficiency can be ensured under the high illuminance environment obtained by sunlight.

Specifically, a photoelectric conversion device according to an embodiment of the present invention includes at least a first photoelectric conversion element and a second photoelectric conversion element which are stacked so as to overlap with each other in the light direction. Further, the photoelectric conversion device includes at least a first DC-DC converter and a second DC-DC converter. When a first electric power generated in the first photoelectric conversion element is transmitted to the first DC-DC converter, the first DC-DC converter adjusts a voltage of the first electric power and outputs the voltage. When a second electric power generated in the second photoelectric conversion element is transmitted to the second DC-DC converter, the second DC-DC converter adjusts a voltage of the second electric power and outputs the voltage. In addition, photoelectric conversion efficiency of the first photoelectric conversion element is higher than photoelectric conversion efficiency of the second photoelectric conversion element under an environment having first illuminance. The photoelectric conversion efficiency of the second photoelectric conversion element is higher than the photoelectric conversion efficiency of the first photoelectric conversion element under an environment having second illuminance higher than the first illuminance Further, part of the first electric power is used as drive electric power of the first DC-DC converter and drive electric power of the second DC-DC converter.

With the structure, an embodiment of the present invention can provide a multiterminal photoelectric conversion device in which high photoelectric conversion efficiency can be obtained under the high illuminance environment and operational reliability can be ensured in a wide illuminance range.

BRIEF DESCRIPTION OF THE DRAWINGS

FIG. 11 illustrates a configuration of a photoelectric conversion device.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Accordingly, the invention should not be construed as being limited to the description of the embodiments below.

Note that a photoelectric conversion device according to an embodiment of the present invention includes at least a photoelectric conversion element which converts optical energy to electric energy and a DC-DC converter which uses electric power from the photoelectric conversion element as input power. The photoelectric conversion device according to an embodiment of the present invention may further include a power storage portion (such as a secondary battery and a capacitor) in which charging is performed using output power from the DC-DC converter.

Further, a single or a plurality of photoelectric conversion devices (cells) connected to a terminal for outputting electric power to the outside of the photoelectric conversion devices correspond to a photoelectric conversion module or a photoelectric conversion panel. The photoelectric conversion module or the photoelectric conversion panel may be reinforced with a protective material such as a resin, tempered glass, or a metal frame in order to protect the cell from moisture, dirt, ultraviolet rays, physical stress, or the like. A plurality of photoelectric conversion modules or photoelectric conversion panels connected in series or in parallel to obtain predetermined electric power correspond to a photoelectric conversion array. The photoelectric conversion device of the present invention ranges over a photoelectric conversion module and a photoelectric conversion array.

(Embodiment 1)

Figure 1:
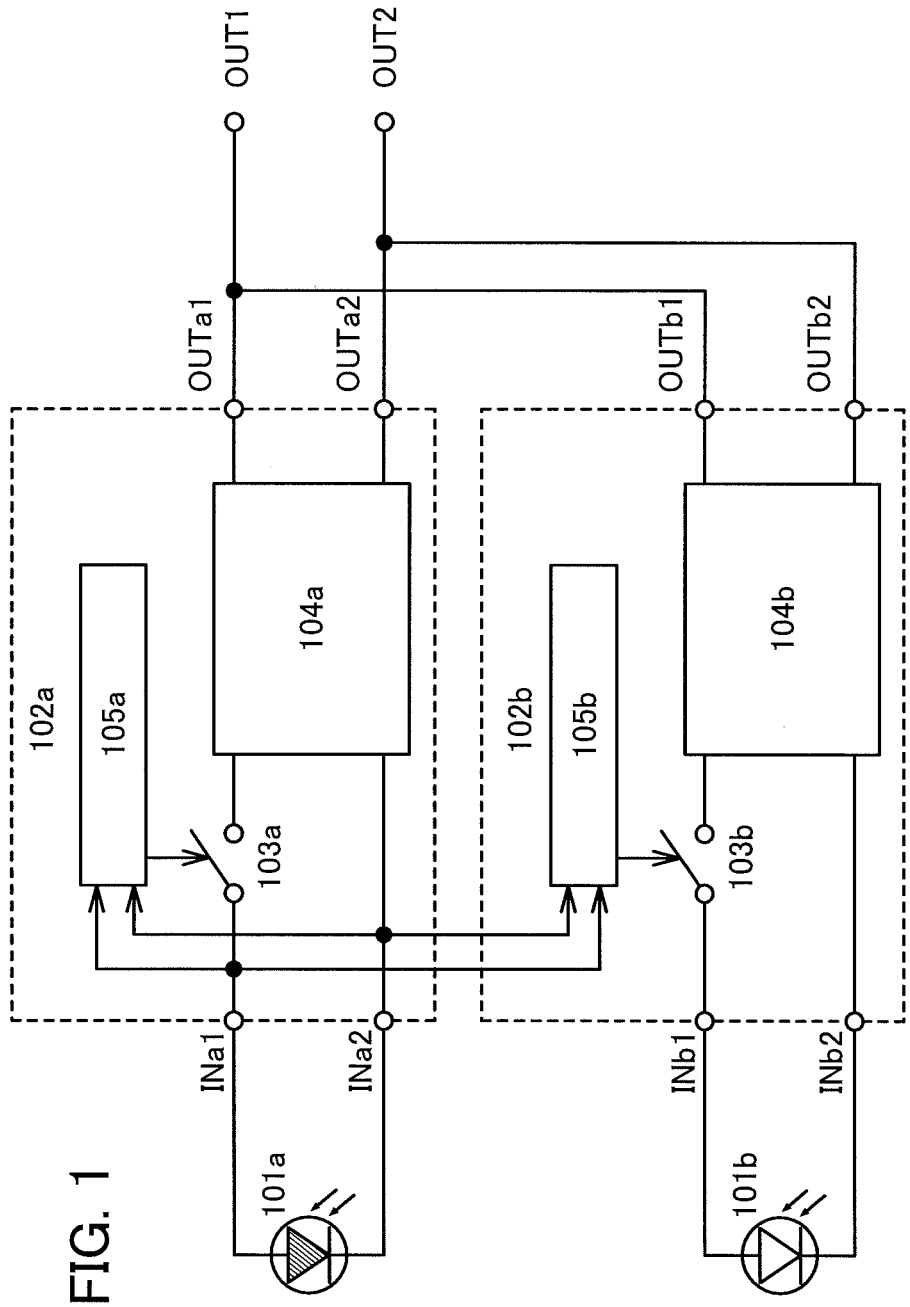
FIG. 1 illustrates a configuration of a photoelectric conversion device.

FIG. 1 illustrates an example of a configuration of a photoelectric conversion device according to an embodiment of the present invention. The photoelectric conversion device in FIG. 1 includes a first photoelectric conversion element 101a, a second photoelectric conversion element 101b, a first DC-DC converter 102a, and a second DC-DC converter 102b.

The first photoelectric conversion element 101a generates electric power from optical energy of light irradiation and supplies the electric power (input power) to the first DC-DC converter 102a. Then, the first DC-DC converter 102a adjusts the voltage of the input power and outputs the voltage as output power. Similarly, the second photoelectric conversion element 101b generates electric power from optical energy of light irradiation and supplies the electric power (input power) to the second DC-DC converter 102b. Then, the second DC-DC converter 102b adjusts the voltage of the input power and outputs the voltage as output power.

The first photoelectric conversion element 101a and the second photoelectric conversion element 101b are stacked so as to overlap with each other in the light direction. Further, the first photoelectric conversion element 101a and the second photoelectric conversion element 101b are stacked so that light transmitting through the first photoelectric conversion element 101a enters the second photoelectric conversion element 101b.

Note that a photoelectric conversion element in the specification includes at least one photoelectric conversion layer with which photoelectromotive force can be obtained by light irradiation and a pair of electrodes (conductive films) for taking out the photoelectromotive force from the photoelectric conversion layer. Further, the photoelectric conversion layer may be a semiconductor layer with a single semiconductor junction such as a p-n junction and a p-i-n junction as typical examples or a dye sensitization-type layer which can obtain photoelectromotive force using organic dye which absorbs light.

Furthermore, one photoelectric conversion element may include a plurality of photoelectric conversion layers connected in series. In the case where the plurality of photoelectric conversion layers are connected in series, the directions of the forward biases of all of the photoelectric conversion layers are set to be the same. The plurality of photoelectric conversion layers may have voltage-current characteristics different from each other or similar voltage-current characteristics. By using the plurality of photoelectric conversion layers connected in series, the photoelectric conversion element can obtain high electromotive force. Note that in the case where one photoelectric conversion element is formed using the plurality of photoelectric conversion layers connected in series, current flowing through all of the photoelectric conversion layers is determined by a photoelectric conversion layer having the lowest short-circuit current. Therefore, it is preferable that the plurality of photoelectric conversion layers have similar voltage-current characteristics. That is because it is possible to drive the plurality of photoelectric conversion layers at the respective maximum output points, at which the maximum output voltages can be output, so that higher electromotive force can be obtained.

It is preferable that at least two of a plurality of photoelectric conversion elements which overlap with each other in the light direction absorb lights in different wavelength regions. The plurality of photoelectric conversion elements absorbing lights with different wavelengths are overlapped, so that sunlight with a wide wavelength from ultraviolet rays to infrared rays can be converted to electric energy with a high degree of conversion efficiency without waste.

In an embodiment of the present invention, one of a plurality of photoelectric conversion elements has high photoelectric conversion efficiency under an environment in which room light can be obtained and low photoelectric conversion efficiency under a high illuminance environment, in comparison with another one of the plurality of photoelectric conversion elements. Specifically, in the photoelectric conversion device in FIG. 1, the photoelectric conversion efficiency of the first photoelectric conversion element 101a is higher than that of the second photoelectric conversion element 101b under a low illuminance environment. On the other hand, the photoelectric conversion efficiency of the second photoelectric conversion element 101b is higher than that of the first photoelectric conversion element 101a under the high illuminance environment.

Note that room light means light which can be obtained from artificial light sources. The artificial light source means a light source which artificially emits light utilizing thermal energy, chemical energy, electric energy, or the like. Specific examples of artificial light sources are a burning light source such as a gas lamp, an incandescent lamp, a discharge lamp such as a fluorescent lamp, and an electroluminescent element such as a LED, an organic EL, or an inorganic EL. The illuminance is higher than or equal to 100 lux and lower than or equal to 1000 lux under the enviromnent in which room light can be obtained. The illuminance is higher than or equal to 10000 lux and lower than or equal to 150000 lux under the environment in which sunlight can be obtained.

As an example of a combination of the first photoelectric conversion element 101a and the second photoelectric conversion element 101b, it is preferable that an amorphous photoelectric conversion element with a photoelectric conversion layer including amorphous silicon be the first photoelectric conversion element 101a and a single crystal photoelectric conversion element with a photoelectric conversion layer including single crystal silicon be the second photoelectric conversion element 101b. Alternatively, it is preferable that an amorphous photoelectric conversion element be the first photoelectric conversion element 101a and a microcrystalline photoelectric conversion element with a photoelectric conversion layer including microcrystalline silicon be the second photoelectric conversion element 101b.

Note that a combination of the first photoelectric conversion element 101a and the second photoelectric conversion element 101b is not limited to the above structures. In the photoelectric conversion device according to an embodiment of the present invention, as described above, the following conditions are satisfied: one of the photoelectric conversion elements has high photoelectric conversion efficiency under the high illuminance environment and low photoelectric conversion efficiency under the low illuminance environment, in comparison with another one of the photoelectric conversion elements. Further, a difference of photoelectric conversion efficiency due to illuminance depends on, for example, a material, crystallinity, or the like of a semiconductor included in a photoelectric conversion layer; accordingly, the structure of each photoelectric conversion element may be determined so as to meet the above conditions.

In particular, in the photoelectric conversion layer, the crystallinity of a light-absorbing layer which actually absorbs light influences the voltage-current characteristics of the photoelectric conversion element. For example, a photoelectric conversion element with a light-absorbing layer including amorphous silicon is compared to a photoelectric conversion element with a light-absorbing layer including single crystal silicon. Then, the former has higher photoelectric conversion efficiency than that of the latter under the low illuminance environment in which room light is obtained. In addition, the former has lower photoelectric conversion efficiency than that of the latter under the high illuminance environment in which sunlight can be obtained. Note that the result depends on the wavelength of light.

Next, the result of measuring voltage-current characteristics of the first photoelectric conversion element with the photoelectric conversion layer including amorphous silicon and the second photoelectric conversion element with the photoelectric conversion layer including single crystal silicon will be described.

First, as the first photoelectric conversion element used in the measurement, a substrate manufactured by Asahi Glass Co., Ltd. (product name: Asahi-U) in which a 150-nm-thick silicon oxide film and an approximately-600-nm-thick conductive film whose surface had unevenness with the use of tin oxide were stacked in this order over the substrate of soda-lime glass having a thickness of 1.1 mm was used. Further, the first photoelectric conversion element had a structure in which a p-layer, an i-layer, an n-layer, and a conductive film which included indium tin oxide (ITO) and was formed to have a thickness of 50 nm were stacked in this order over the substrate. Then, the first photoelectric conversion element was irradiated with light from the conductive film including ITO side.

A specific method for manufacturing the p-layer, the i-layer, and the n-layer, which were used for the first photoelectric conversion element, will be described. The p-layer was formed to be 10-nm-thick microcrystalline silicon by plasma CVD; the flow rates of monosilane, methylsilane, hydrogen, and a gas diluted with hydrogen so that the concentration of diborane was 0.1 mol % were 4 sccm, 0.7 sccm, 590 sccm, and 18 sccm, respectively; a reaction pressure was 200 Pa; a substrate temperature was 200° C.; and high frequency wave (60 MHz) was used. The i-layer was formed to be 400-nm-thick amorphous silicon by plasma CVD; the flow rates of monosilane and hydrogen were each 25 sccm, a reaction pressure was 40 Pa; a substrate temperature was 280° C.; and high frequency wave (60 MHz) was used. The n-layer was formed to be 10-nm-thick microcrystalline silicon by plasma CVD; the flow rates of monosilane, hydrogen, and a gas diluted with hydrogen so that the concentration of phosphine was 0.5 mol % were 5 sccm, 950 sccm, and 40 sccm, respectively; a reaction pressure was 133 Pa, a substrate temperature was 280° C., and high frequency wave (13.56 MHz) was used.

On the other hand, the second photoelectric conversion element used in the measurement had a structure in which a conductive film formed using aluminum silicon (Al—Si) to have a thickness of 300 nm, a p-layer, a 700-μm-thick p-type single crystal silicon substrate whose plane orientation is (110), an i-layer, an n-layer, and a conductive film which included indium tin oxide (ITO) and was formed to have a thickness of 70 nm were stacked in this order. Then, the second photoelectric conversion element was irradiated with light from the conductive film including ITO side.

A specific method for manufacturing the p-layer, the i-layer, and the n-layer, which were used for the second photoelectric conversion element, will be described. The p-layer was formed to be 20-nm-thick microcrystalline silicon by plasma CVD; the flow rates of monosilane, hydrogen, and diborane are 8 sccm, 1000 sccm, and 30 sccm, respectively; a reaction pressure was 200 Pa; a substrate temperature was 200° C.; and high frequency wave (60 MHz) was used. The i-layer was formed to be 20-nm-thick amorphous silicon by plasma CVD; the flow rates of monosilane and hydrogen are each 25 sccm; a reaction pressure was 40 Pa; a substrate temperature was 280° C., and high frequency wave (60 MHz) was used. The n-layer was formed to be 20-nm-thick microcrystalline silicon by plasma CVD; the flow rates of monosilane, hydrogen, and a gas diluted with hydrogen so that the concentration of phosphine was 0.5 mol % were 5 sccm, 950 sccm, and 40 sccm, respectively; a reaction pressure was 133 Pa; a substrate temperature was 280° C.; and high frequency wave (13.56 MHz) was used.

Note that a light-absorbing layer of the first photoelectric conversion element is formed mainly in the i-layer including amorphous silicon. A light-absorbing layer of the second photoelectric conversion element is formed mainly in the p-type single crystal silicon substrate.

The area of a light-receiving surface of the first photoelectric conversion element was 1 cm$^2$. The area of a light-receiving surface of the second photoelectric conversion element was 95 cm$^2$.

Light irradiation in the measurement of voltage-current characteristics was performed under two conditions. A first condition was the condition for replicating the environment under sunlight: reference solar radiation which was generated by a solar simulator was used, a solar spectrum was AM 1.5, and irradiation intensity was 100 mW/cm$^2$ (1 sun). A second condition was the condition for replicating the environment under room light: a fluorescent lamp emitting light similar to a lamp bulb with an illuminance of 500 lux was used and irradiation intensity was 0.085 mW/cm$^2$.

Figure 2:
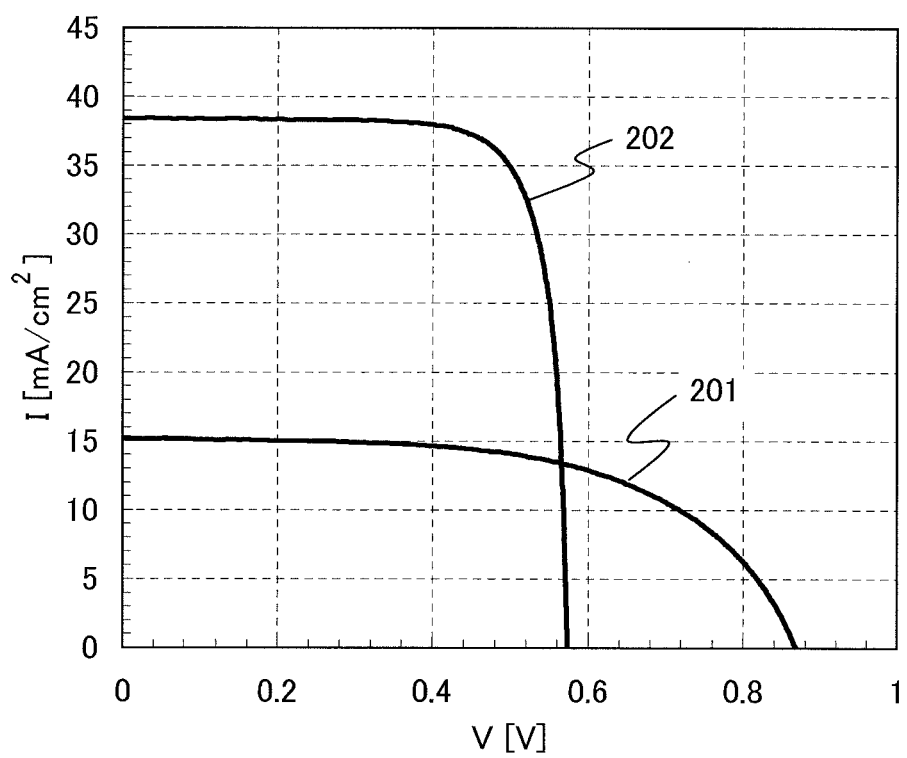
FIG. 2 shows measurement results of voltage-current density characteristics of photoelectric conversion elements.

FIG. 2 shows measurement results of voltage-current density characteristics of the first photoelectric conversion element and the second photoelectric conversion element under the first condition, which has replicated the condition under sunlight. In FIG. 2, a solid line 201 corresponds to the measurement result of the voltage-current density characteristics of the first photoelectric conversion element and a solid line 202 corresponds to the measurement result of the voltage-current density characteristics of the second photoelectric conversion element.

As shown by the solid line 201 in FIG. 2, as for the first photoelectric conversion element, the short-circuit current density was 15.18 mA/cm$^2$, the open circuit voltage was 0.868 V, the fill factor was 0.591. Accordingly, the photoelectric conversion efficiency of the first photoelectric conversion element was 7.79%. As shown by the solid line 202 in FIG. 2, as for the second photoelectric conversion element, the short-circuit current density was 38.45 mA/cm$^2$, the open circuit voltage was 0.5734 V, the fill factor was 0.7919. Accordingly, the photoelectric conversion efficiency of the second photoelectric conversion element was 17.46%.

As a result, under the first condition which has replicated the condition under sunlight, the second photoelectric conversion element whose light-absorbing layer mainly includes single crystal silicon had higher photoelectric conversion efficiency than that of the first photoelectric conversion element whose light-absorbing layer mainly includes amorphous silicon.

Figure 3:
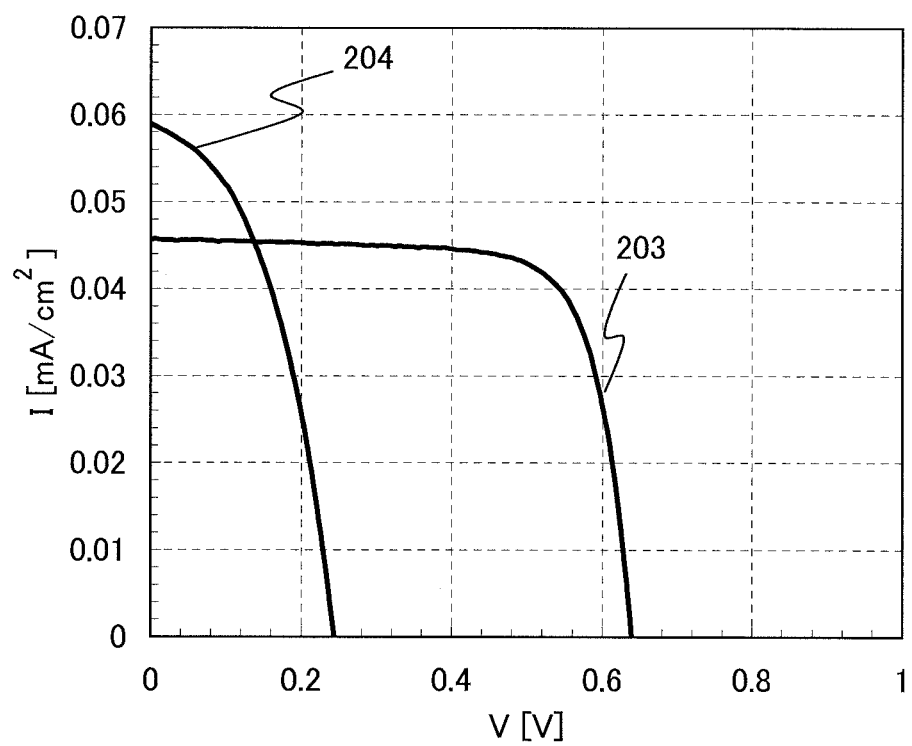
FIG. 3 shows measurement results of voltage-current density characteristics of photoelectric conversion elements.

FIG. 3 shows measurement results of voltage-current density characteristics under the second condition, which has replicated the condition under room light, of the first photoelectric conversion element and the second photoelectric conversion element. In FIG. 3, a solid line 203 corresponds to the measurement result of the voltage-current density characteristics of the first photoelectric conversion element and a solid line 204 corresponds to the measurement result of the voltage-current density characteristics of the second photoelectric conversion element.

As shown by the solid line 203 in FIG. 3, as for the first photoelectric conversion element, the short-circuit current density was 0.046 mA/cm$^2$, the open circuit voltage was 0.639 V, the fill factor was 0.748. Accordingly, the photoelectric conversion efficiency of the first photoelectric conversion element was 25.69%. As shown by the solid line 204 in FIG. 3, as for the second photoelectric conversion element, the short-circuit current density was 0.059 mA/cm$^2$, the open circuit voltage was 0.243 V, the fill factor was 0.448. Accordingly, the photoelectric conversion efficiency of the second photoelectric conversion element was 7.56%.

As a result, under the second condition which has replicated the condition under room light, the first photoelectric conversion element whose light-absorbing layer mainly includes amorphous silicon had higher photoelectric conversion efficiency than that of the second photoelectric conversion element whose light-absorbing layer mainly includes single crystal silicon.

Note that a semiconductor such as silicon or germanium can be used for the photoelectric conversion layers of the first photoelectric conversion element 101a and the second photoelectric conversion element 101b. However, an embodiment of the present invention is not limited to this structure. For example, as the first photoelectric conversion element 101a and the second photoelectric conversion element 101b, a photoelectric conversion element in which Cu, In, Ga, Al, Se, S, or the like is used for the photoelectric conversion layer and which is referred to as a CIS, CIGS, or chalcopyrite cell may be used. Alternatively, a CdTe—CdS-based photoelectric conversion element with a photoelectric conversion layer including a Cd compound may be used as the first photoelectric conversion element 101a and the second photoelectric conversion element 101b. As the first photoelectric conversion element 101a and the second photoelectric conversion element 101b, an organic photoelectric conversion element with a photoelectric conversion layer including an organic material, such as a dye sensitization photoelectric conversion element and an organic semiconductor photoelectric conversion element, may be used.

Note that light in a short wavelength region has higher energy than light in a long wavelength region. Accordingly, a photoelectric conversion element, which performs photoelectric conversion by using light in the short wavelength region, among a plurality of photoelectric conversion elements is provided to be closer to the light incident side; as a result, loss of light in the short wavelength region in the photoelectric conversion device can be suppressed, and therefore, the photoelectric conversion efficiency can be enhanced. For example, an amorphous photoelectric conversion element has high photoelectric conversion efficiency in a short wavelength region (0.4 μm to 0.6 μm). A single crystal photoelectric conversion element has high photoelectric conversion efficiency in a long wavelength region (0.4 μm to 0.9 μm). In this case, it is preferable that an amorphous photoelectric conversion element be the first photoelectric conversion element 101a closer to the light incident side and a single crystal photoelectric conversion element be the second photoelectric conversion element 101b farther from the light incident side. That is because the photoelectric conversion efficiency of the whole photoelectric conversion device can be enhanced.

Further, in the photoelectric conversion device according to an embodiment of the present invention, each of the plurality of DC-DC converters includes a switching element, a voltage conversion portion, and a control circuit. Specifically, in the case of the photoelectric conversion device in FIG. 1, the first DC-DC converter 102a includes a first switching element 103a, a first voltage conversion portion 104a, and a first control circuit 105a. The second DC-DC converter 102b includes a second switching element 103b, a second voltage conversion portion 104b, and a second control circuit 105b.

The configuration of the first DC-DC converter 102a and operation thereof are described below with reference to FIG. 1.

In the first DC-DC converter 102a, input power is supplied from the first photoelectric conversion element 101a to an input terminal INa1 and an input terminal INa2 of the first DC-DC converter 102a, and then, the first switching element 103a controls supply of voltage (input voltage), which has been supplied to the input terminal INa1, to the first voltage conversion portion 104a. Specifically, the input voltage at a high level is supplied from the input terminal INa1 to the first voltage conversion portion 104a when the first switching element 103a is ON and the supply of the input voltage is stopped when the first switching element 103a is OFF. To the input terminal INa2, the input voltage at a low level is supplied; specifically, fixed voltage such as ground voltage is supplied. That is to say, in accordance with switching of the first switching element 103a, a signal with a pulsed voltage waveform in which the input voltage at the high level and the fixed voltage appear alternately is supplied to the first voltage conversion portion 104a.

The first voltage conversion portion 104a includes at least each one of a coil, a capacitor, and a diode. The first voltage conversion portion 104a generates output power with a constant-output voltage by smoothing or holding voltage of a signal when the pulsed signal is supplied.

The first control circuit 105a generates a control signal with a pulsed voltage waveform and supplies the control signal to a gate electrode of the first switching element 103a. The operation of the first switching element 103a is controlled in accordance with the voltage Vgs between the gate electrode and a source terminal. In the case where the voltage of the control signal is supplied to the gate electrode, the voltage Vgs between the gate electrode and the source terminal changes in accordance with the pulse voltage waveform of the control signal and thus the first switching element 103a performs switching by repeating ON and OFF. The duty ratio in the switching, which is the ratio of ON time to OFF time, depends on the voltage of the control signal.

Note that as described above, the first switching element 103a controls supply of the input voltage to the first voltage conversion portion 104a. For that reason, when the duty ratio in the switching changes, the duty ratio of the signal having a pulse voltage waveform supplied to the first voltage conversion portion 104a also changes; as a result, the value of the output voltage output from the first voltage conversion portion 104a changes. Specifically, the signal supplied to the first voltage conversion portion 104a is a signal with a pulse voltage waveform in which input voltage and fixed voltage appear alternately. In the signal, an increase in percentage of periods in which pulses of the input voltage are generated leads to an increase in difference between the output voltage and the fixed voltage. In contrast, in the signal, a decrease in percentage of periods in which pulses of the input voltage are generated leads to a decrease in difference between the output voltage and the fixed voltage. That is, the amount of the output voltage of the first voltage conversion portion 104a is commensurate with the duty ratio of the switching of the first switching element 103a.

Similarly, the configuration of the second DC-DC converter 102b and operation thereof are described.

In the second DC-DC converter 102b, as in the first DC-DC converter 102a, input power is supplied from the first photoelectric conversion element 101b to an input terminal INb1 and an input terminal INb2 of the second DC-DC converter 102b, and then, the second switching element 103b controls supply of voltage (input voltage), which has been supplied to the input terminal INb1, to the second voltage conversion portion 104b. Specifically, the input voltage at a high level is supplied from the input terminal INb1 to the second voltage conversion portion 104b when the second switching element 103b is ON and the supply of the input voltage is stopped when the second switching element 103b is OFF. To the input terminal INb2, the input voltage at a low level is supplied; specifically, fixed voltage such as ground voltage is supplied. That is to say, in accordance with switching of the second switching element 103b, a signal with a pulsed voltage waveform in which the input voltage at the high level and the fixed voltage appear alternately is supplied to the second voltage conversion portion 104b.

The second voltage conversion portion 104b has a configuration similar to that of the first voltage conversion portion 104a. The second voltage conversion portion 104b generates output power with a constant-output voltage by smoothing or holding voltage of a signal when the pulsed signal is supplied.

Similarly to the first control circuit 105a, the second control circuit 105b generates a control signal with a pulsed voltage waveform and supplies the control signal to a gate electrode of the second switching element 103b. Similarly to the first switching element 103a, the second switching element 103b performs switching by repeating ON and OFF in accordance with the control signal.

That is to say, the signal supplied to the second voltage conversion portion 104b is a signal with a pulse voltage waveform in which input voltage and fixed voltage appear alternately. In the signal, an increase in percentage of periods in which pulses of the input voltage are generated leads to an increase in difference between the output voltage of the second voltage conversion portion 104b and the fixed voltage. In contrast, in the signal, a decrease in percentage of periods in which pulses of the input voltage are generated leads to a decrease in difference between the output voltage of the second voltage conversion portion 104b and the fixed voltage. That is, the amount of the output voltage of the second voltage conversion portion 104b is commensurate with the duty ratio of the switching of the second switching element 103b.

Note that in FIG. 1, the first switching element 103a and the second switching element 103b are provided between the input terminal INa1 and the first voltage conversion portion 104a and between the input terminal INb1 and the second voltage conversion portion 104b, respectively. However, the photoelectric conversion device according to an embodiment of the present invention is not limited to this configuration. In the first DC-DC converter 102a, the position at which the first switching element 103a is provided depends on the circuit configuration of the first DC-DC converter 102a. In the second DC-DC converter 102b, the position to which the second switching element 103b is provided depends on the circuit configuration of the second DC-DC converter 102b.

Further, in an embodiment of the present invention, part of input power supplied to the first DC-DC converter 102a is supplied to the first control circuit 105a and the second control circuit 105b. The first control circuit 105a and the second control circuit 105b use the part of input power as drive electric power and operate.

The first photoelectric conversion element 101a can generate electric power which can be drive electric power of the first DC-DC converter 102a and the second DC-DC converter 102b, even under the low illuminance environment in which room light is obtained. Accordingly, with the above structure, the first DC-DC converter 102a and the second DC-DC converter 102b can be driven even under the low illuminance environment in which room light is obtained. Therefore, operational reliability of a photoelectric conversion device can be ensured in a wide illuminance range. The second photoelectric conversion element 101b can generate electric power higher than that of the first photoelectric conversion element 101a under the high illuminance environment in which sunlight can be obtained. Thus, the photoelectric conversion efficiency of a photoelectric conversion device can be enhanced.

Figure 4:
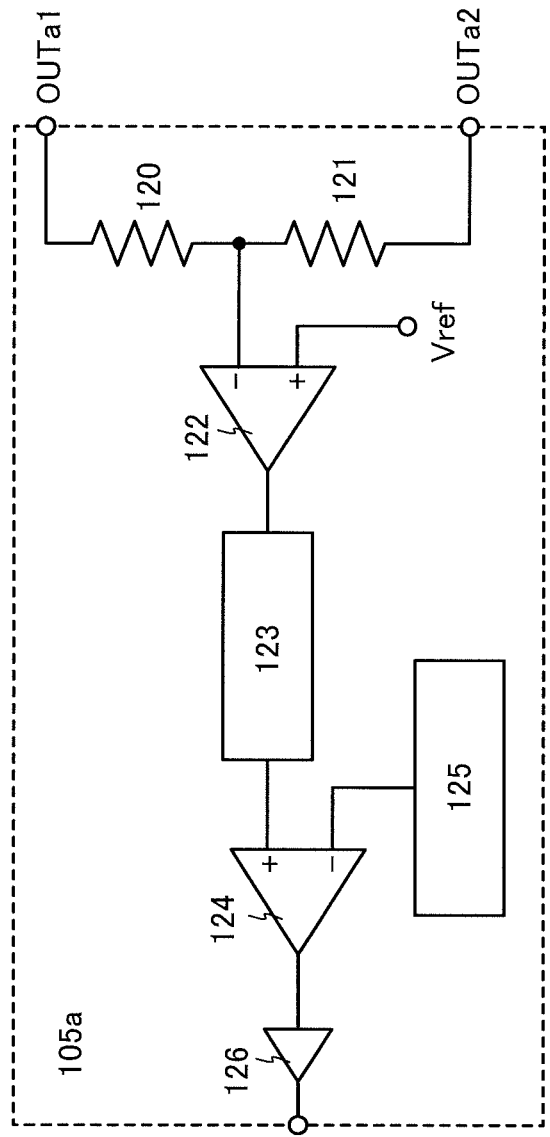
FIG. 4 illustrates a configuration of a control circuit.

FIG. 4 illustrates an example of the configuration of the first control circuit 105a. Note that the second control circuit 105b has a configuration similar to that of the first control circuit 105a. Accordingly, the configuration of the second control circuit 105b can refer to the following description of the configuration of the first control circuit 105a.

The first control circuit 105a in FIG. 4 includes a resistor 120, a resistor 121, an error amplifier 122, a phase compensation circuit 123, a comparator 124, a triangle wave generator 125, and a buffer 126. Part of electric power output from the first photoelectric conversion element 101a is supplied to a circuit which is included in each of the first control circuit 105a and the second control circuit 105b and which needs electric power for operation. Specific examples of such a circuit are the error amplifier 122, the phase compensation circuit 123, the comparator 124, the triangle wave generator 125, and the buffer 126.

In the first control circuit 105a, the resistor 120 and the resistor 121 are connected in series. One of terminals of the resistor 120 is supplied with the output voltage from an output terminal OUTa1 of the first DC-DC converter 102a. One of terminals of the resistor 121 is supplied with fixed voltage, such as ground voltage. A node in which the other of the terminals of the resistor 120 and the other of the terminals of the resistor 121 are connected is connected to an inverting input terminal (−) of the error amplifier 122. Therefore, the output voltage is divided by the resistor 120 and the resistor 121 and supplied to the inverting input terminal (−) of the error amplifier 122.

A non-inverting input terminal (+) of the error amplifier 122 is supplied with a reference voltage Vref. In the error amplifier 122, the voltage supplied to the inverting input terminal (−) and the reference voltage Vref are compared and a signal with voltage obtained by amplification of the difference thereof is output from an output terminal of the error amplifier 122.

The voltage of the signal output from the error amplifier 122 is supplied to the phase compensation circuit 123. The phase compensation circuit 123 adjusts a phase of the voltage of the signal output from the error amplifier 122 and then outputs the adjusted signal. Note that the first control circuit 105a does not necessarily include the phase compensation circuit 123. Note that the phase of the voltage is adjusted by the phase compensation circuit 123, so that oscillation of an output voltage of an amplifier, such as the error amplifier 122 or the comparator 124, is prevented and the operation of the first DCDC converter 102a can be stabilized.

The voltage of the signal output from the phase compensation circuit 123 is supplied to a non-inversion input terminal (+) of the comparator 124. A triangle wave signal or a saw-tooth signal which is output from the triangle wave generator 125 is supplied to the inversion input terminal (−) of the comparator 124. Thus, the comparator 124 outputs a control signal with a rectangle wave which has a constant frequency and which has a pulse width varying in accordance with the voltage supplied to the non-inverting input terminal (+). The control signal output from the comparator 124 is output from the first control circuit 105a through the buffer 126. Then, the control signal output from the first control circuit 105a is input to the first switching element 103a.

Note that FIG. 4 shows an example of a configuration of the first control circuit 105a in the case of generating a control signal for pulse width modulation control (PWM). Note that in the photoelectric conversion device according to an embodiment of the present invention, the first DC-DC converter 102a and the second DC-DC converter 102b may operate with the use of a control signal for pulse frequency modulation control (PFM).

Note that, as an example, the photoelectric conversion device in FIG. 1 includes the first photoelectric conversion element 101a, the first DC-DC converter 102a for the first photoelectric conversion element 101a, the second photoelectric conversion element 101b, and the second DC-DC converter 102b for the second photoelectric conversion element 101b. However, an embodiment of the present invention is not limited to two pairs of photoelectric conversion elements and DC-DC converters. For example, the number of combinations of photoelectric conversion elements and DC-DC converters may be three or more.

Further, in the photoelectric conversion device in FIG. 1, the output terminals of the first DC-DC converter 102a are connected to the output terminals of the second DC-DC converter 102b in parallel. That is to say, the output terminal OUTa1 and the output terminal OUTb1 are connected to each other. The sum of voltages of the output terminal OUTa1 and the output terminal OUTb1 is supplied to an output terminal OUT1 of the photoelectric conversion device as output voltage. Further, an output terminal OUTa2 and an output terminal OUTb2 are connected to each other. The sum of voltages of the output terminal OUTa2 and the output terminal OUTb2 is supplied to an output terminal OUT2 of the photoelectric conversion device as output voltage.

In the case where output terminals of a plurality of DC-DC converters are connected in parallel as in the photoelectric conversion device in FIG. 1, the potential of the output terminal OUTa1 and the potential of the output terminal OUTb1 surely become equal to each other; therefore, the output voltage of the photoelectric conversion device is not likely changed and stable output voltage can be obtained.

Figure 8:
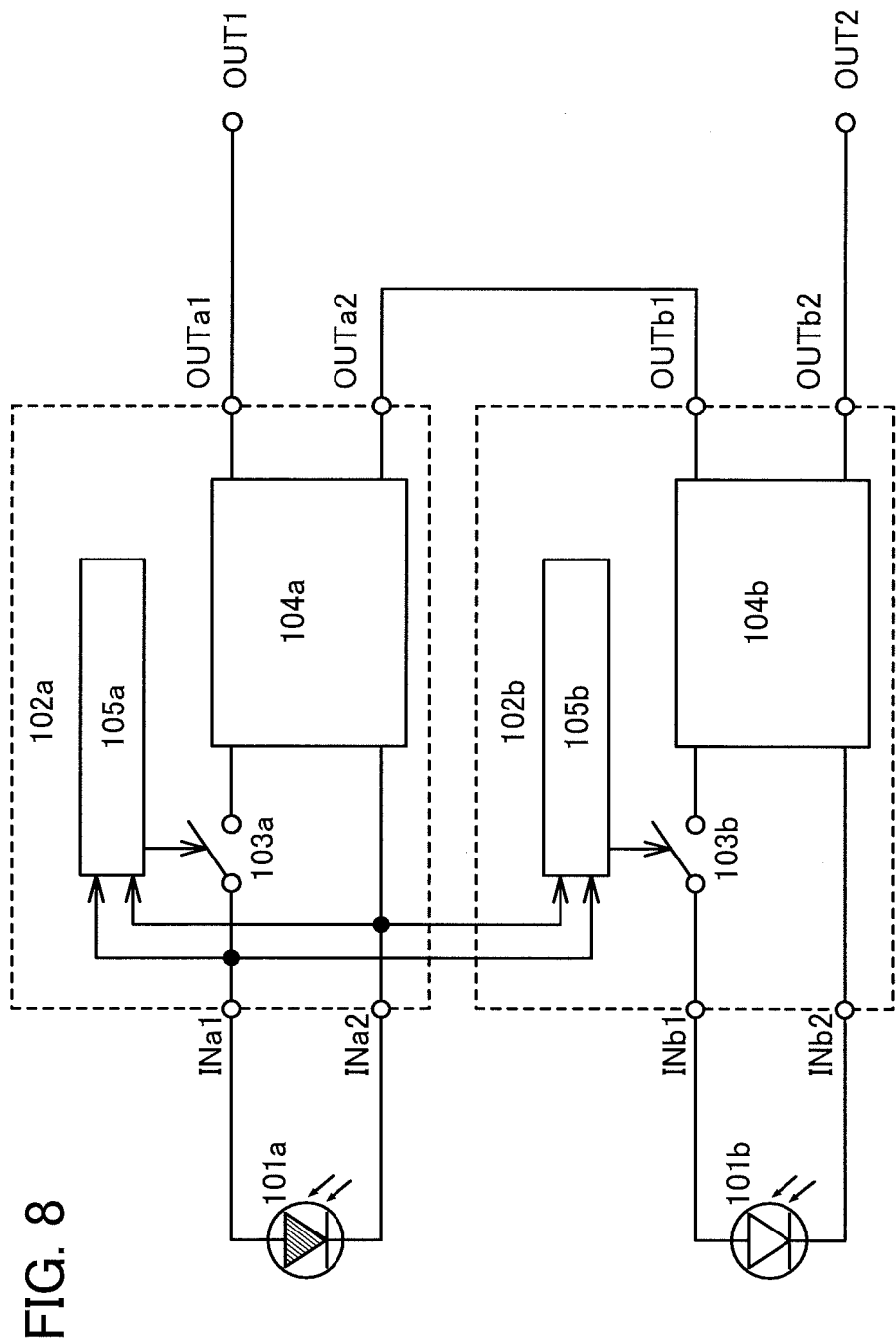
FIG. 8 illustrates a configuration of a photoelectric conversion device.

Note that in the photoelectric conversion device according to an embodiment of the present invention, output terminals of a plurality of DC-DC converters may be connected in series. FIG. 8 illustrates a configuration of a photoelectric conversion device in which the output terminals of the first DC-DC converter 102a are connected to the output terminals of the second DC-DC converter 102b in series. The photoelectric conversion device in FIG. 8 has the only difference from the photoelectric conversion device in FIG. 1 in connection among the output terminal OUTa1 of the first DC-DC converter 102a, the output terminal OUTa2 of the first DC-DC converter 102a, the output terminal OUTb1 of the second DC-DC converter 102b, and the output terminal OUTb2 of the second DC-DC converter 102b.

Specifically, in the photoelectric conversion device in FIG. 8, the output terminal OUTa2 is connected to the output terminal OUTb1. The voltage of the output terminal OUTa1 is supplied to the output terminal OUT1 of the photoelectric conversion device as output voltage. Further, the voltage of the output terminal OUTb2 is supplied to the output terminal OUT2 of the photoelectric conversion device as output voltage.

In the case where output terminals of a plurality of DC-DC converters are connected in series as in the photoelectric conversion device in FIG. 8, voltage the amount of which is equal to the sum of output voltages of the plurality of DC-DC converters can be obtained as the output voltage of the photoelectric conversion device. That is to say, the voltage between the output terminal OUT1 and the output terminal OUT2 corresponds to the sum of the voltage between the output terminal OUTa1 and the output terminal OUTa2 and the voltage between the output terminal OUTb1 and the output terminal OUTb2.

Note that connection of output terminals of a plurality of DC-DC converters is not limited to the configurations of FIG. 1 and FIG. 8, and practitioners can design the configuration freely.

Next, specific configurations of the first voltage conversion portion 104a and the second voltage conversion portion 104b are illustrated.

Figure 5A:
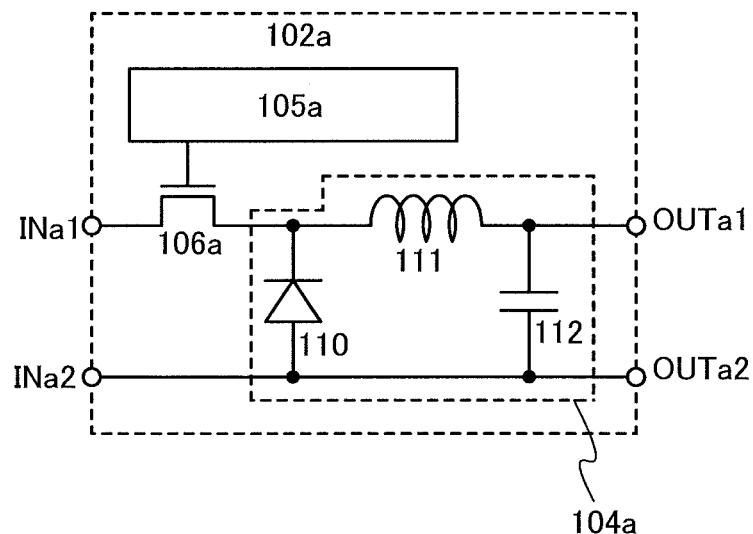
FIGS. 5A and 5B each illustrate a configuration of a DC-DC converter.

FIG. 5A illustrates a specific configuration of the first DC-DC converter 102a as an example. Note that the second DC-DC converter 102b has a configuration similar to that of the first DC-DC converter 102a. Accordingly, the configuration of the second DC-DC converter 102b can refer to the following description of the configuration of the first DC-DC converter 102a.

Note that "connection" in this specification means electrical connection and corresponds to the state in which current, voltage, or potential can be supplied or conducted. Accordingly, a connection state means not only a state of a direct connection but also a state of indirect connection through a circuit element such as a wiring, a resistor, a diode, or a transistor so that current, a potential, or voltage can be supplied or transmitted.

In addition, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

The terms "source terminal" and "drain terminal" of a transistor interchange with each other depending on the polarity of the transistor or a difference between levels of potentials supplied to the electrodes. In general, in an n-channel transistor, a terminal to which a low potential is supplied is called a source terminal, and a terminal to which a high potential is supplied is called a drain terminal. Further, in a p-channel transistor, a terminal to which a low potential is supplied is called a drain terminal, and a terminal to which a high potential is supplied is called a source terminal. In the following description, one of a source terminal and a drain terminal is a first terminal and the other is a second terminal. A configuration of the first DC-DC converter 102a will be described below.

In addition, a "source terminal" of a transistor means a source region that is part of an active layer or a source electrode connected to an active layer. Similarly, "drain terminal" of a transistor means a drain region that is part of an active layer or a drain electrode connected to an active layer.

The first DC-DC converter 102a in FIG. 5A is a step-down DC-DC converter with which output voltage lower than input voltage can be obtained. The first DC-DC converter 102a in FIG. 5A includes a transistor 106a functioning as a switching element, the first voltage conversion portion 104a, and the first control circuit 105a.

Further, the first DC-DC converter 102a in FIG. 5A includes the input terminal INa1 supplied with input voltage, the input terminal INa2 supplied with fixed voltage, the output terminal OUTa1, and the output terminal OUTa2.

The first voltage conversion portion 104a in FIG. 5A includes a diode 110, a coil 111, and a capacitor 112. The transistor 106a controls connection between the input terminal INa1 and a cathode of the diode 110. Specifically, a first terminal of the transistor 106a is connected to the input terminal INa1 and a second terminal of the transistor 106a is connected to the cathode of the diode 110. One of terminals of the coil 111 is connected to the cathode of the diode 110 and the other of the terminals of the coil 111 is connected to the output terminal OUTa1 of the first DC-DC converter 102a. The input terminal INa2 is connected to an anode of the diode 110 and the output terminal OUTa2. One of electrodes of the capacitor 112 is connected to the output terminal OUTa1 and the other of the electrodes of the capacitor 112 is connected to the output terminal OUTa2.

In the first DC-DC converter 102a in FIG. 5A, when the transistor 106a is turned on, current flows through the coil 111 because of a potential difference between the input terminal INa1 and the output terminal OUTa1. The coil 111 is magnetized by the current flow, and electromotive force in a direction opposite to that of the current flow is generated by self induction. Thus, voltage which is obtained by a decrease in input voltage supplied to the input terminal INa1 is supplied to the output terminal OUTa1. In other words, between the pair of electrodes of the capacitor 112, voltage corresponding to a difference between fixed voltage supplied from the input terminal INa2 and the voltage obtained by the decrease in the input voltage is supplied.

Next, when the transistor 106a is turned off, a current path formed between the input terminal INa1 and the output terminal OUTa1 is blocked. In the coil 111, the electromotive force in the direction preventing the change of the current, that is, in the direction opposite to that of electromotive force generated when the transistor 106a is ON is generated. Therefore, the current that flows to the coil 111 is kept by voltage generated by the electromotive force. In other words, when the transistor 106a is OFF, a current path is formed between the output terminal OUTa1 and the input terminal INa2 or the output terminal OUTa2 through the coil 111 and/or the diode 110. Accordingly, voltage supplied between the pair of electrodes of the capacitor 112 is held to some extent.

Note that voltage held in the capacitor 112 corresponds to voltage output from the output terminal OUTa1. In the above operation, as a percentage of ON time of the transistor 106a becomes higher, the voltage held in the capacitor 112 becomes closer to a difference between the fixed voltage and the input voltage. Accordingly, the voltage can be decreased so that the output voltage whose level is closer to that of the input voltage is obtained. In contrast, as a percentage of OFF time of the transistor 106a becomes higher, a difference between the fixed voltage and the voltage held in the capacitor 112 becomes smaller. Accordingly, the voltage can be decreased so that output voltage whose level is closer to the level of the fixed voltage is obtained.

Then, other specific configurations of the first voltage conversion portion 104a and the second voltage conversion portion 104b are described.

Figure 5B:
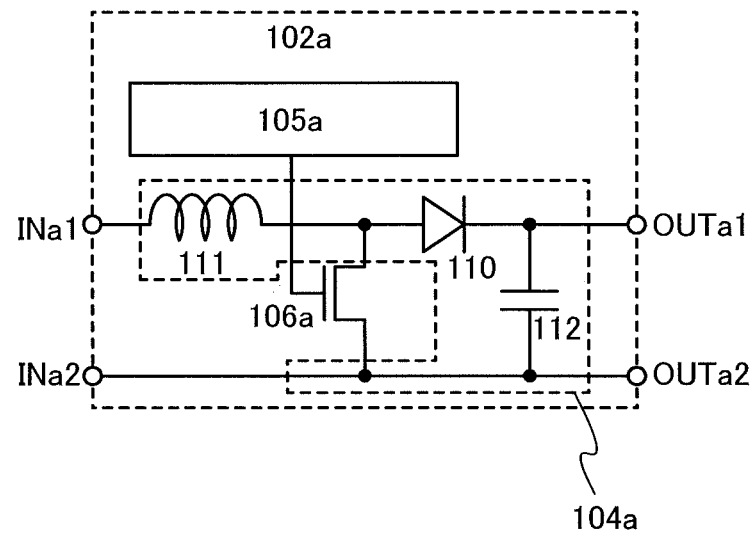

FIG. 5B illustrates a specific configuration of the first DC-DC converter 102a as an example. The first DC-DC converter 102a in FIG. 5B is a step-up DC-DC converter with which output voltage higher than input voltage can be obtained. The first DC-DC converter 102a in FIG. 5B includes a transistor 106a functioning as a switching element, a first voltage conversion portion 104a, and the first control circuit 105a.

Further, the first DC-DC converter 102a in FIG. 5B includes the input terminal INa1 supplied with input voltage, the input terminal INa2 supplied with fixed voltage, the output terminal OUTa1, and the output terminal OUTa2.

The first voltage conversion portion 104a in FIG. 5B includes a diode 110, a coil 111, and a capacitor 112. One of the terminals of the coil 111 is connected to the input terminal INa1 and the other of the terminals of the coil 111 is connected to an anode of the diode 110. The transistor 106a controls connection between the input terminal INa2 or the output terminal OUTa2 and a node between the coil 111 and the diode 110. Specifically, a first terminal of the transistor 106a is connected to the node between the coil 111 and the diode 110, and a second terminal of the transistor 106a is connected to the input terminal INa2 and the output terminal OUTa2. A cathode of the diode 110 is connected to the output terminal OUTa1. One of electrodes of the capacitor 112 is connected to the output terminal OUTa1 and the other of the electrodes of the capacitor 112 is connected to the output terminal OUTa2.

In the first DC-DC converter 102a in FIG. 5B, when the transistor 106a is turned on, current flows to the coil 111 because of a potential difference between the input terminal INa1 and the input terminal INa2. The coil 111 is magnetized because the current flows thereto. Note that in the coil 111, electromotive force in an opposite direction to that of the current flow is generated by self induction, so that the current is gradually increased.

Then, when the transistor 106a is turned off, a current path formed between the input terminal INa1 and the input terminal INa2 is blocked. In the coil 111, the electromotive force in the direction preventing the change of the current, that is, in the direction opposite to that of electromotive force generated when the transistor 106a is ON is generated. Thus, voltage based on the amount of current flowing through the coil 111 at the time when the transistor 106a is ON is generated between the pair of terminals of the coil 111. Then, current flowing through the coil 111 is held by voltage generated between the terminals. In other words, when the transistor 106a is OFF, a current path is formed between the input terminal INa2 and the output terminal OUTa1 through the coil 111 and the diode 110. At this time, voltage which is the sum of the input voltage supplied to the input terminal INa1 and the voltage generated between the terminals of the coil 111 is supplied to the output terminal OUTa1, and the voltage is output from the first DC-DC converter 102a as output voltage. Voltage corresponding to a difference between the voltage of the output terminal OUTa1 and the fixed voltage is held between the electrodes of the capacitor 112.

In the above operation, when the ratio of ON time of the transistor 106a is high, the amount of current flowing through the coil 111 right before the transistor 106a is turned off is increased. Therefore, voltage between the terminals of the coil 111 is high when the transistor 106a is turned off, which allows the boosting in voltage so that a difference between the output voltage and the input voltage is increased. In contrast, when the ratio of OFF time of the transistor 106a is high, the amount of current flowing through the coil 111 right before the transistor 106a is turned off is decreased. Therefore, voltage between the terminals of the coil 111 is low when the transistor 106a is turned off, which allows the boosting in voltage so that a difference between the output voltage and the input voltage is reduced.

Figure 6A:
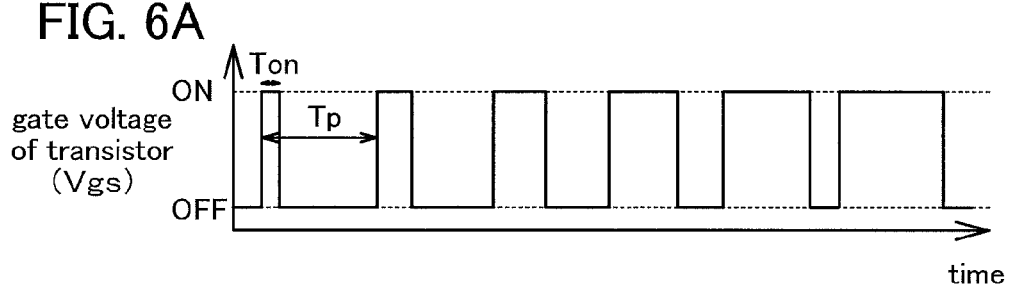
FIG. 6A illustrates change over time in voltage Vgs and FIG. 6B illustrates change over time in voltage Vout.

Then, FIG. 6A illustrates change over time in gate voltage Vgs of a transistor functioning as the first switching element 103a or the second switching element 103b in the case of using pulse width control, as an example. In FIG. 6A, the gate voltage Vgs has a pulse waveform, and a pulse width Ton becomes gradually wider as time passes. Note that in the case of the pulse width control, the time interval Tp between timings at which pulses are generated is kept constant and the pulse width Ton is variable.

Figure 6B:
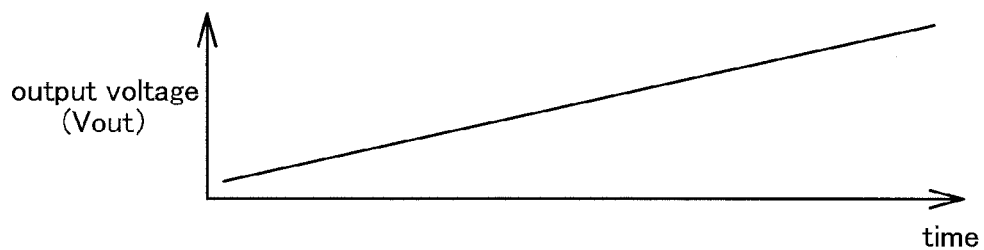

FIG. 6B illustrates a change over time of output voltage Vout obtained when the switching of the transistor is performed in accordance with the gate voltage Vgs illustrated in FIG. 6A. As illustrated in FIG. 6B, as the pulse width Ton is increased, higher output voltage Vout can be obtained.

Figure 7A:
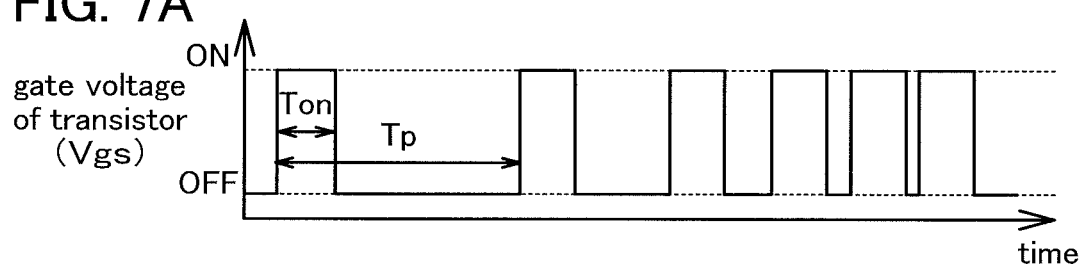
FIG. 7A illustrates change over time in voltage Vgs and FIG. 7B illustrates change over time in voltage Vout.

FIG. 7A shows an example of a change over time of the gate voltage Vgs of the transistor in the case of employing the pulse frequency control. In FIG. 7A, pulsed voltage is supplied to the gate voltage Vgs and the time interval Tp between timings at which pulses are generated is smaller as time passes. In the case of the pulse frequency control, the pulse width Ton is kept constant and the time interval Tp between timings at which pulses are generated is variable.

Figure 7B:
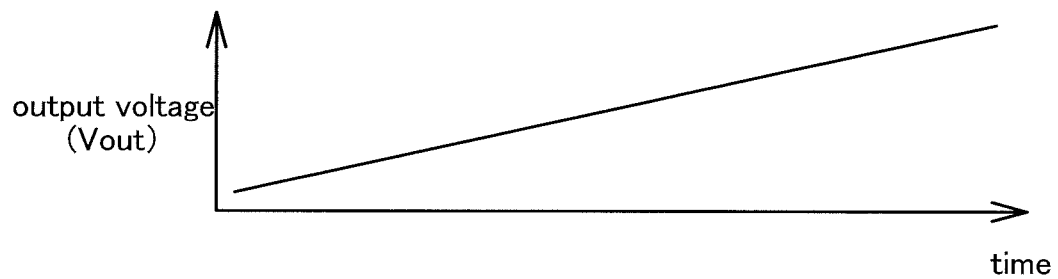

FIG. 7B illustrates a change over time of the output voltage Vout obtained when switching of the transistor is performed in accordance with the gate voltage Vgs illustrated in FIG. 7A. As illustrated in FIG. 7B, as the time interval Tp between timings at which pulses are generated is smaller as time passes, output voltage Vout is increased.

Note that in an embodiment of the present invention, the output voltage may be adjusted by a combination of the pulse width control and the pulse frequency control which are utilized for switching of the transistor. In the case of low output power, the frequency of switching of the transistor can be suppressed to be low by the pulse frequency control rather than by the pulse width control; accordingly, power loss due to switching of the transistor is suppressed to be low. In contrast, in the case of high output power, the frequency of switching of the transistor can be suppressed to be low by the pulse width control rather than by the pulse frequency control; accordingly, power loss due to the switching of the transistor is suppressed to be low. Therefore, the pulse width control and the pulse frequency control may be switched depending on the amount of the output power, whereby power conversion efficiency can be enhanced.

Note that FIGS. 5A and 5B each illustrate an example in which one transistor functions as a switching element, but the present invention is not limited thereto. In one embodiment of the present invention, a plurality of transistors may function as one switching element. In the case where the plurality of transistors function as one switching element, the plurality of transistors may be connected to each other in parallel, in series, or in combination of a parallel connection and a series connection.

Note that in this specification, the state in which the transistors are connected to each other in series means, for example, the state in which only one of a first terminal and a second terminal of a first transistor is connected to only one of a first terminal and a second terminal of a second transistor. Further, the state in which the transistors are connected to each other in parallel means a state in which the first terminal of the first transistor is connected to the first terminal of the second transistor and the second terminal of the first transistor is connected to the second terminal of the second transistor.
(Embodiment 2)

Figure 10A:
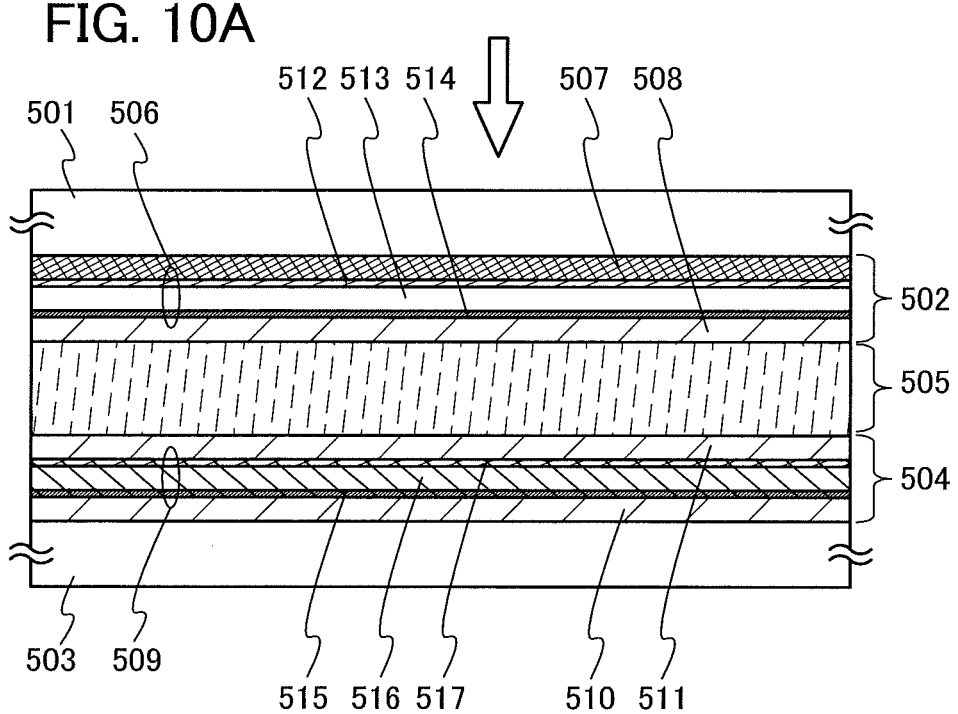
FIGS. 10A and 10B each illustrate a cross-sectional structure of a first photoelectric conversion element and a second photoelectric conversion element.
Figure 10B:
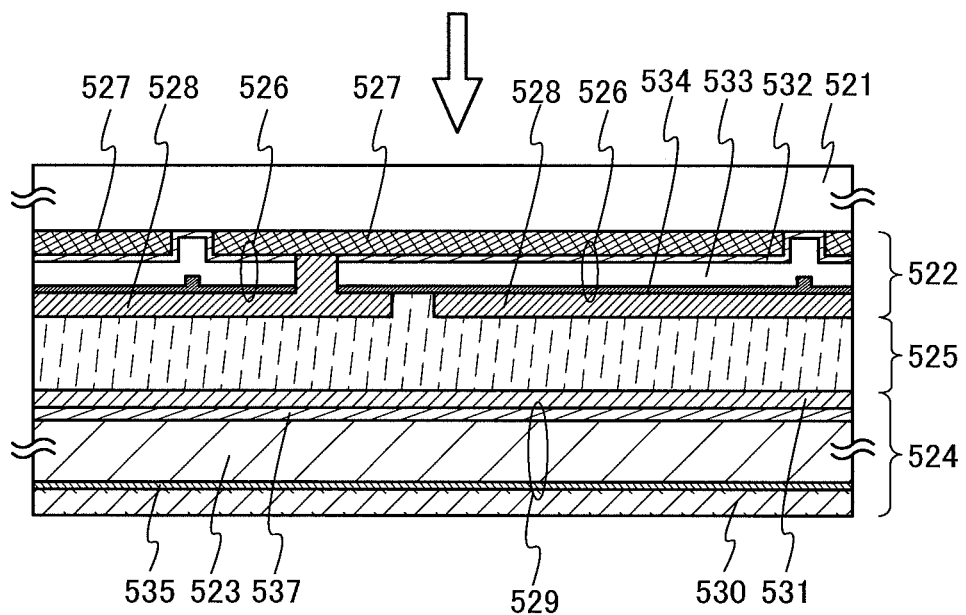

A photoelectric conversion device according to an embodiment of the present invention includes at least two photoelectric conversion elements. FIGS. 10A and 10B each illustrate a cross-sectional structure of the first photoelectric conversion element and the second photoelectric conversion element which overlap with each other in the light direction, as an example. In this embodiment, structures of the photoelectric conversion device according to an embodiment of the present invention are described with reference to FIGS. 10A and 10B.

FIG. 10A illustrates the case where the first photoelectric conversion element and the second photoelectric conversion element each include a photoelectric conversion layer which is a thin semiconductor layer. Specifically, the photoelectric conversion device in FIG. 10A includes a substrate 501, a first photoelectric conversion element 502 supported by the substrate 501, a substrate 503, a second photoelectric conversion element 504 supported by the substrate 503, and an adhesive layer 505 with which the first photoelectric conversion element 502 and the second photoelectric conversion element 504 adhere to each other.

The first photoelectric conversion element 502 in FIG. 10A includes a photoelectric conversion layer 506, and conductive films 507 and 508 with the photoelectric conversion layer 506 provided therebetween. The conductive film 507 is closer to the substrate 501 than the conductive film 508. The second photoelectric conversion element 504 includes a photoelectric conversion layer 509, and conductive films 510 and 511 with the photoelectric conversion layer 509 provided therebetween. The conductive film 510 is closer to the substrate 503 than the conductive film 511. Note that FIG. 10A illustrates the case where the first photoelectric conversion element 502 and the second photoelectric conversion element 504 each include a single photoelectric conversion layer; however, each of the first photoelectric conversion element 502 and the second photoelectric conversion element 504 may include a plurality of photoelectric conversion layers which are stacked.

In FIG. 10A, the photoelectric conversion layer 506 includes a p-layer 512, an i-layer 513, and an n-layer 514. The p-layer 512, the i-layer 513, and the n-layer 514 are stacked in this order from the conductive film 507 side, whereby a p-i-n junction is formed. In FIG. 10A, the photoelectric conversion layer 509 includes an n-layer 515, an i-layer 516, and a p-layer 517. The n-layer 515, the i-layer 516, and the p-layer 517 are stacked form the conductive film 510 side, whereby a p-i-n junction is formed.

Note that a p-layer is a semiconductor layer with p-type conductivity. An i-layer is a semiconductor layer with i-type conductivity. An n-layer is a semiconductor layer with n-type conductivity.

FIG. 10A illustrates the case where the photoelectric conversion layer 506 and the photoelectric conversion layer 509 each have a p-i-n junction; however, each of the photoelectric conversion layer 506 and the photoelectric conversion layer 509 may have a p-n junction.

Further, the photoelectric conversion layer 506 included in the first photoelectric conversion element 502 and the photoelectric conversion layer 509 included in the second photoelectric conversion element 504 are provided in this order so as to overlap with each other in the light direction shown by an arrow. That is to say, when attention is given only to the photoelectric conversion layer 506 and the photoelectric conversion layer 509, the photoelectric conversion device in FIG. 10A has a structure in which the p-layer 512, the i-layer 513, the n-layer 514, the p-layer 517, the i-layer 516, and the n-layer 515 are stacked in this order from the substrate 501 side, from which light is delivered.

Note that in FIG. 10A, light is delivered from the substrate 501 side; however, light may be delivered from the substrate 503 side. In this case, the p-layer 512 is preferably provided so as to be closer to the light incident side than the n-layer 514. Further, the p-layer 517 is preferably provided so as to be closer to the light incident side than the n-layer 515. The reason is that the life of a hole as a carrier is as short as approximately half of the life of an electron as a carrier. When light enters the photoelectric transducer layer having a p-i-n junction, a large amount of electrons and holes are formed in the i-layer, the electrons move to the n-type semiconductor layer side, and the holes move to the p-type semiconductor layer side, which produces electromotive force. When light is delivered from the p-type semiconductor layer side, a large number of electrons and holes are foamed in a region in the i-layer, and the region is closer to the p-type semiconductor layer than to the n-type semiconductor layer. Consequently, a distance that the holes with a short lifetime move to the p-type semiconductor layer can be shortened. This produces high electromotive force.

Further, the p-layer 512, the i-layer 513, and the n-layer 514 which are included in the photoelectric conversion layer 506, and the p-layer 517, the i-layer 516, and the n-layer 515 which are included in the photoelectric conversion layer 509 may be an amorphous semiconductor or a semiconductor with crystallinity such as a single crystal semiconductor, a polycrystalline semiconductor, or a microcrystalline semiconductor. Furthermore, silicon, silicon germanium, germanium, silicon carbide, or the like can be used for the p-layer 512, the i-layer 513, and the n-layer 514 which are included in the photoelectric conversion layer 506, and the p-layer 517, the i-layer 516, and the n-layer 515 which are included in the photoelectric conversion layer 509. Note that in an embodiment of the present invention, the following conditions are met: the first photoelectric conversion element 502 has higher photoelectric conversion efficiency than that of the second photoelectric conversion element 504 under the low illuminance environment, and the second photoelectric conversion element 504 has higher photoelectric conversion efficiency than that of the first photoelectric conversion element 502 under the high illuminance environment. A difference in photoelectric conversion efficiency due to illuminance is due to a material of a semiconductor which forms a photoelectric conversion layer, the crystallinity of the photoelectric conversion layer, or the like. Therefore, the structure of the photoelectric conversion layer 506 and the structure of the photoelectric conversion layer 509 may be decided to satisfy the above condition.

It is preferable that a layer on the light incident side be formed using a material having a small light absorption coefficient. For example, silicon carbide has a smaller light absorption coefficient than silicon. Accordingly, silicon carbide is used for the p-layer or the n-layer which is a layer closer to the light incident side, so that the amount of incident light which reaches the i-layer can be increased; as a result, electromotive force of a photoelectric conversion element can be enhanced.

In FIG. 10A, the p-layer 512, the i-layer 513, and the n-layer 514 which are included in the photoelectric conversion layer 506 are formed using amorphous silicon. The p-layer 517, the i-layer 516, and the n-layer 515 which are included in the photoelectric conversion layer 509 are formed using microcrystalline silicon.

Note that a microcrystalline semiconductor is a semiconductor having an intermediate structure between amorphous and crystalline structures (including single crystal and polycrystal). The microcrystalline semiconductor is a semiconductor having a third state which is stable in terms of free energy. For example, the microcrystalline semiconductor layer is a layer including a semiconductor having a crystal grain size greater than or equal to 2 nm and less than or equal to 200 nm, preferably greater than or equal to 10 nm and less than or equal to 80 nm, more preferably greater than or equal to 20 nm and less than or equal to 50 nm. The Raman spectrum of microcrystalline silicon, which is a typical example of a microcrystalline semiconductor, is shifted to a wave number lower than 520 $cm^{-1}$, which represents a peak of the Raman spectrum of single crystal silicon. That is, the peak of a Raman spectrum of microcrystalline silicon is within the range from 520 $cm^{-1}$ which represents single crystal silicon, to 480 $cm^{-1}$ which represents amorphous silicon. In addition, microcrystalline silicon contains hydrogen or halogen of at least 1 atomic percent or more in order to terminate a dangling bond. Moreover, the microcrystalline semiconductor may contain a rare gas element such as helium, argon, krypton, or neon to further promote lattice distortion, so that stability is increased and a favorable microcrystalline semiconductor can be obtained. Such a microcrystalline semiconductor has lattice distortion which changes the optical characteristics from the indirect transition of single crystal silicon into the direct transition. At least 10% of lattice distortion makes the optical characteristics change into the direct transition. When distortion exits locally, the optical characteristics in which the direct transition and the indirect transition are mixed can be obtained.

Note that light with a short wavelength has higher energy than light with a long wavelength. Accordingly, in the photoelectric conversion device in FIG. 10A, the first photoelectric conversion element 502 performs photoelectric conversion utilizing light in the shorter wavelength region than light used in photoelectric conversion by the second photoelectric conversion element 504 in the case where the photoelectric conversion layer 506 of the first photoelectric conversion element 502 is formed using amorphous silicon and the photoelectric conversion layer 509 of the second photoelectric conversion element 504 is formed using microcrystalline silicon. Accordingly, the first photoelectric conversion element 502 is provided so as to be closer to the light incident side; as a result, loss of light in the short wavelength region in the photoelectric conversion device can be suppressed, and therefore, the photoelectric conversion efficiency can be enhanced.

Note that the semiconductor used for the i-layer is a semiconductor in which an impurity element imparting p-type or n-type conductivity is contained at a concentration less than or equal to $1 \times 10^{20}$ atoms/$cm^3$, oxygen and nitrogen are contained at a concentration less than or equal to $9 \times 10^{19}$ atoms/$cm^3$, and photoconductivity is at least 100 times as high as the dark conductivity. The i-layer may contain boron at 1 ppm to 1000 ppm. The i-layer sometimes has weak n-type conductivity when an impurity element for controlling valence electrons is not added intentionally. This phenomenon remarkably appears when the i-layer is formed using an amorphous semiconductor. Accordingly, when a photoelectric conversion layer having a p-i-n junction is founded, an impurity element imparting p-type conductivity may be added to the i-layer at the same time as or after film formation. As the impurity element imparting p-type conductivity, boron can be typically used, and an impurity gas such as $B_2H_6$ or $BF_3$ may be mixed at 1 ppm to 1000 ppm into a semiconductor source gas. The concentration of boron may be, for example, $1 \times 10^{14}$ atoms/$cm^3$ to $6 \times 10^{16}$ atoms/$cm^3$.

Alternatively, when the i-layer is formed after the p-layer is formed, the impurity element imparting p-type conductivity included in the p-layer can be diffused into the i-layer. With the structure, even when the impurity element imparting p-type conductivity is not added to the i-layer intentionally, valence electrons of the i-layer can be controlled.

One or both of the substrate 501 and the substrate 503 have light-transmitting properties. FIG. 10A illustrates the case where light is delivered from the substrate 501 side; accordingly, at least the substrate 501 has a light-transmitting property. Specifically, the substrate 501 and the substrate 503 can be formed using a glass substrate of soda-lime glass, clear glass, lead glass, tempered glass, ceramic glass, or the like. Further, a non-alkali glass substrate of aluminosilicate glass, barium borosilicate glass, aluminoborosilicate glass, or the like; a quartz substrate; or the like can be used as well. Further, a metal substrate of stainless steel or the like, over the surface of which an insulating film is formed, has a low light-transmitting property and therefore can be used as the substrate 503. As for ceramic substrates, there are a ceramic substrate with a high light-transmitting property and a ceramic substrate with a low light-transmitting property. The ceramic substrate with a high light-transmitting property can be used as both the substrate 501 and the substrate 503. The ceramic substrate with a low light-transmitting property can be used as the substrate 503.

There is a tendency that a flexible substrate formed using a synthetic resin such as plastics generally has a lower allowable temperature limit than the above substrates; however, such a substrate can be used as long as it can withstand processing temperature in manufacturing steps.

Note that anti-reflective films may be provided on light incident surfaces of the substrate 501 and the substrate 503. For example, a titanium oxide film or a titanium oxide film to which at least one metal element selected from copper, manganese, nickel, cobalt, iron, and zinc is added can be used as the anti-reflective films.

Assuming that light is delivered to the photoelectric conversion device from the substrate 501 side, a conductive material with a light-transmitting property can be used for the conductive film 507 and the conductive film 508 which are included in the first photoelectric conversion element 502 and the conductive film 511 which is included in the second photoelectric conversion element 504. Specific examples of the conductive material with a light-transmitting property are indium tin oxide containing silicon oxide (ITSO), indium tin oxide (ITO), zinc oxide (ZnO), indium zinc oxide (IZO), and gallium-doped zinc oxide (GZO). A conductive material which easily reflects light, specifically, aluminum, silver, titanium, tantalum, or the like is used for the conductive film 510 included in the second photoelectric conversion element 504. Alternatively, a conductive material with a light-transmitting property can be used for the conductive film 510. Note that in that case, it is preferable that a reflective film on which light transmitted through the second photoelectric conversion element 504 is reflected be formed over the surface of the substrate 503 opposite to the second photoelectric conversion element 504. For the reflective film, it is preferable to use a material which easily reflects light, such as aluminum, silver, titanium, or tantalum.

In the case where the conductive film 510 is formed using a conductive material which easily reflects light, by formation of unevenness on the surface which is in contact with the photoelectric conversion layer 509, light is reflected diffusely on the surface of the conductive film 510; therefore, the light absorptance of the photoelectric conversion layer 509 can be increased and photoelectric conversion efficiency can be enhanced. In a similar manner, in the case where a reflective film is formed, when the surface of the conductive film 510 from which light from the reflective film is delivered is made uneven, photoelectric conversion efficiency can be enhanced.

Note that as the light-transmitting conductive material, a conductive high molecular material (also referred to as conductive polymer) can be used instead of oxide metal such as indium oxide. As the conductive high molecular material, a π electron conjugated high molecular can be used. For example, polyaniline and/or a derivative thereof, polypyrrole and/or a derivative thereof, polythiophene and/or a derivative thereof, and a copolymer of two or more kinds of aniline, pyrrole, and thiophene and/or a derivative thereof can be given.

The adhesive layer 505 has a light-transmitting property and is provided between the first photoelectric conversion element 502 and the second photoelectric conversion element 504. A material which can transmit light is used for the adhesive layer 505. For example, a thermosetting resin such as an epoxy resin, an unsaturated polyester resin, a polyimide resin, a bismaleimide-triazine resin, or a cyanate resin can be used for the adhesive layer 505. Alternatively, a thermoplastic resin such as a polyphenylene oxide resin, a polyetherimide resin, or a fluorine resin can be used as the adhesive layer 505. Further, a plurality of above-described thermosetting resin and thermoplastic resin may be used for the adhesive layer 505. When the above-described organic resin is used, the first photoe-lectric conversion element 502 can be fixed to the second photoelectric conversion element 504 by heat treatment.

Note that each of the first photoelectric conversion element 502 and the second photoelectric conversion element 504 may include a plurality of photoelectric conversion elements connected in series. FIG. 10B illustrates the case where the first photoelectric conversion element includes a plurality of photoelectric conversion elements connected in series. Further, in FIG. 10B, the first photoelectric conversion element includes a photoelectric conversion layer, which is formed using a thin semiconductor layer, and the second photoelectric conversion element is formed using a single crystal semiconductor substrate.

Specifically, the photoelectric conversion device in FIG. 10B includes a substrate 521, a first photoelectric conversion element 522 supported by the substrate 521, a p-type single crystal semiconductor substrate 523, a second photoelectric conversion element 524 including the p-type single crystal semiconductor substrate 523, an adhesive layer 525 with which the first photoelectric conversion element 522 and the second photoelectric conversion element 524 adhere to each other.

The first photoelectric conversion element 522 in FIG. 10B includes a plurality of photoelectric conversion layers 526, and a plurality of conductive films 527 and a plurality of conductive films 528 with the photoelectric conversion layers 526 provided therebetween. The conductive film 527 is closer to the substrate 521 than the conductive film 528. The plurality of photoelectric conversion layers 526 provided over the substrate 521 are connected in series through the conductive films 527 and the conductive films 528. That is to say, the first photoelectric conversion element 522 has a structure in which a plurality of photoelectric conversion elements each of which includes the photoelectric conversion layer 526, the conductive film 527, and the conductive film 528 are connected in series.

Further, the second photoelectric conversion element 524 includes a photoelectric conversion layer 529, and a conductive film 530 and a conductive film 531 with the photoelectric conversion layer 529 provided therebetween. Note that FIG. 10B illustrates the case where the second photoelectric conversion element 524 includes a single photoelectric conversion layer; however, the second photoelectric conversion element 524 may include a plurality of photoelectric conversion layers which are stacked with each other.

In FIG. 10B, each of the photoelectric conversion layers 526 includes a p-layer 532, an i-layer 533, and an n-layer 534. The p-layer 532, the i-layer 533, and the n-layer 534 are stacked in this order from the conductive film 527 side, whereby a p-i-n junction is formed. Further, in FIG. 10B, the photoelectric conversion layer 529 includes a p-layer 535, the p-type single crystal semiconductor substrate 523, and an n-layer 537. The p-layer 535, the p-type single crystal semiconductor substrate 523, and the n-layer 537 are stacked in this order from the conductive film 530 side, whereby a p-n junction is formed.

FIG. 10B illustrates the case where the photoelectric conversion layer 526 and the photoelectric conversion layer 529 include a p-i-n junction and a p-n junction, respectively. Note that the photoelectric conversion layer 526 may include a p-n junction. The photoelectric conversion layer 529 may include a p-i-n junction.

Further, as in FIG. 10A, the photoelectric conversion layer 526 included in the first photoelectric conversion element 522 and the photoelectric conversion layer 529 included in the second photoelectric conversion element 524 are provided so as to overlap with each other in the light direction shown by an arrow, in this order.

Further, the p-layer 532, the i-layer 533, and the n-layer 534 which are included in the photoelectric conversion layer 526 may be an amorphous semiconductor or a semiconductor with crystallinity such as a single crystal semiconductor, a polycrystalline semiconductor, and a microcrystalline semiconductor. Furthermore, silicon, silicon germanium, germanium, silicon carbide, or the like can be used for the p-layer 532, the i-layer 533, and the n-layer 534 which are included in the photoelectric conversion layer 526, and the n-layer 537, the p-type single crystal semiconductor substrate 523, and the p-layer 535 which are included in the photoelectric conversion layer 529. Note that in an embodiment of the present invention, the following conditions are met: the first photoelectric conversion element 522 has higher photoelectric conversion efficiency than that of the second photoelectric conversion element 524 under the low illuminance environment, and the second photoelectric conversion element 524 has higher photoelectric conversion efficiency than that of the first photoelectric conversion element 522 under the high illuminance environment. A difference in photoelectric conversion efficiency depending on illuminance is due to a material of a semiconductor which forms a photoelectric conversion layer, the crystallinity of the photoelectric conversion layer, or the like. Therefore, the structure of the photoelectric conversion layer 526 and the structure of the photoelectric conversion layer 529 may be decided to satisfy the above condition.

In FIG. 10B, the p-layer 532, the i-layer 533, and the n-layer 534 which are included in the photoelectric conversion layer 526 are formed using amorphous silicon. The n-layer 537 and the p-layer 535 which are included in the photoelectric conversion layer 529 are formed using single crystal silicon.

Note that light with a short wavelength has higher energy than light with a long wavelength. Accordingly, in the photoelectric conversion device in FIG. 10B, the first photoelectric conversion element 522 performs photoelectric conversion utilizing more light in the shorter wavelength region than light used in photoelectric conversion by the second photoelectric conversion element 524 in the case where the photoelectric conversion layer 526 of the first photoelectric conversion element 522 is formed using amorphous silicon and the photoelectric conversion layer 529 of the second photoelectric conversion element 524 is formed using single crystal silicon. Accordingly, the first photoelectric conversion element 522 is provided so as to be closer to the light incident side; as a result, loss of light in the short wavelength region in the photoelectric conversion device can be suppressed, and therefore, the photoelectric conversion efficiency can be enhanced.

Any substrate can be used as the substrate 521 as long as the substrate has a light-transmitting property. As the substrate 521, a substrate similar to the substrate 501 in FIG. 10A can be used.

Assuming that light is delivered to the photoelectric conversion device from the substrate 521 side, the above conductive material with a light-transmitting property can be used for the conductive film 527 and the conductive film 528 which are included in the first photoelectric conversion element 522 and the conductive film 531 which is included in the second photoelectric conversion element 524. A conductive material which easily reflects light, specifically, aluminum, silver, titanium, tantalum, or the like is used for the conductive film 530 included in the second photoelectric conversion element 524. Alternatively, a conductive material with a light-transmitting property can be used for the conductive film 530. Note that in that case, it is preferable that a reflective film on which light transmitted through the second photoelectric conversion element 524 is reflected be formed over the surface of the conductive film 530 opposite to the p-layer 535. For the reflective film, it is preferable to use a material which easily reflects light, such as aluminum, silver, titanium, or tantalum.

In the case where the conductive film 530 is formed using a conductive material which easily reflects light, by formation of unevenness on the surface of the conductive film 530, which is in contact with the photoelectric conversion layer 529, light is reflected diffusely on the surface; therefore, the light absorptance of the photoelectric conversion layer 529 can be increased and photoelectric conversion efficiency can be enhanced. In a similar manner, in the case where a reflective film is formed, when the surface of the conductive film 530 from which light from the reflective film is delivered is made uneven, photoelectric conversion efficiency can be enhanced.

The adhesive layer 525 has a light-transmitting property and is provided between the first photoelectric conversion element 522 and the second photoelectric conversion element 524. For the adhesive layer 525, a material similar to that of the adhesive layer 505 can be used.

This embodiment can be implemented by being combined as appropriate with any of the above-described embodiment.
(Embodiment 3)

In this embodiment, an example of a DC-DC converter having a voltage conversion portion with a configuration different from that in the DC-DC converter illustrated in FIGS. 5A and 5B will be described. Note that in this embodiment, the first voltage conversion portion 104a included in the first DC-DC converter 102a will be described. The second DC-DC converter 102b has a configuration similar to that of the first DC-DC converter 102a, and therefore, the configuration of the second DC-DC converter 102b can refer to the following description about the configuration of the first DC-DC converter 102a.

Figure 9A:
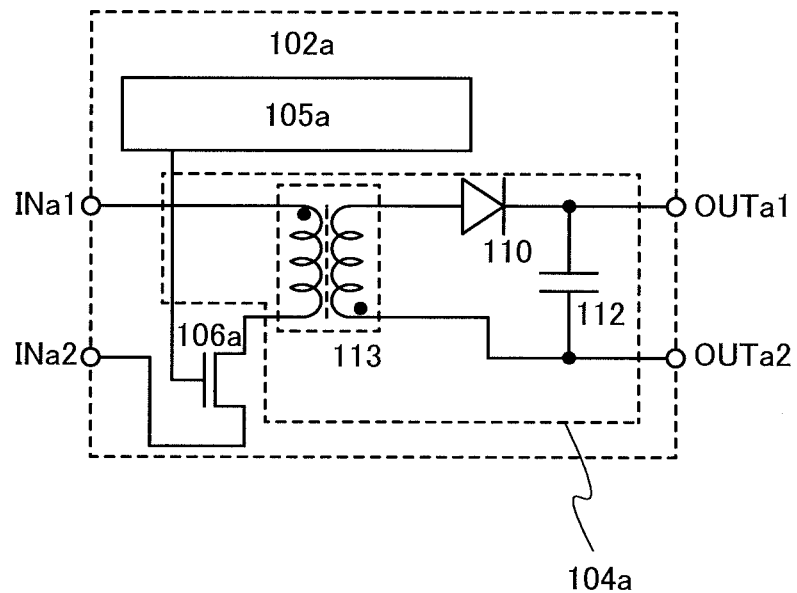
FIGS. 9A and 9B each illustrate a configuration of a DC-DC converter.

FIG. 9A illustrates a specific configuration of the first fly-back DC-DC converter 102a, as an example. The first DC-DC converter 102a in FIG. 9A includes the transistor 106a functioning as a switching element, the first voltage conversion portion 104a, and the first control circuit 105a.

In the first DC-DC converter 102a in FIG. 9A, the first voltage conversion portion 104a includes the diode 110, the capacitor 112, and a transformer 113. The first DC-DC converter 102a in FIG. 9A includes the input terminal INa1 supplied with the input voltage, the input terminal INa2 supplied with the fixed voltage, the output terminal OUTa1, and the output terminal OUTa2.

The transformer 113 includes a first coil and a second coil in which a common core is provided for each of the centers of the coils. The transistor 106a controls connection between the input terminal INa2 and one of terminals of the first coil of the transformer 113. Specifically, a first terminal of the transistor 106a is connected to the input terminal INa2, and a second terminal of the transistor 106a is connected to the one of the terminals of the first coil of the transformer 113. The other of the terminals of the first coil of the transformer 113 is connected to the input terminal INa1.

One of terminals the second coil of the transformer 113 is connected to the anode of the diode 110 and the other of the terminals of the second coil is connected to the output terminal OUTa2. The cathode of the diode 110 is connected to the output terminal OUTa1. One of electrodes of the capacitor 112 is connected to the output terminal OUTa1 and the other of the electrodes of the capacitor 112 is connected to the output terminal OUTa2.

Figure 9B:
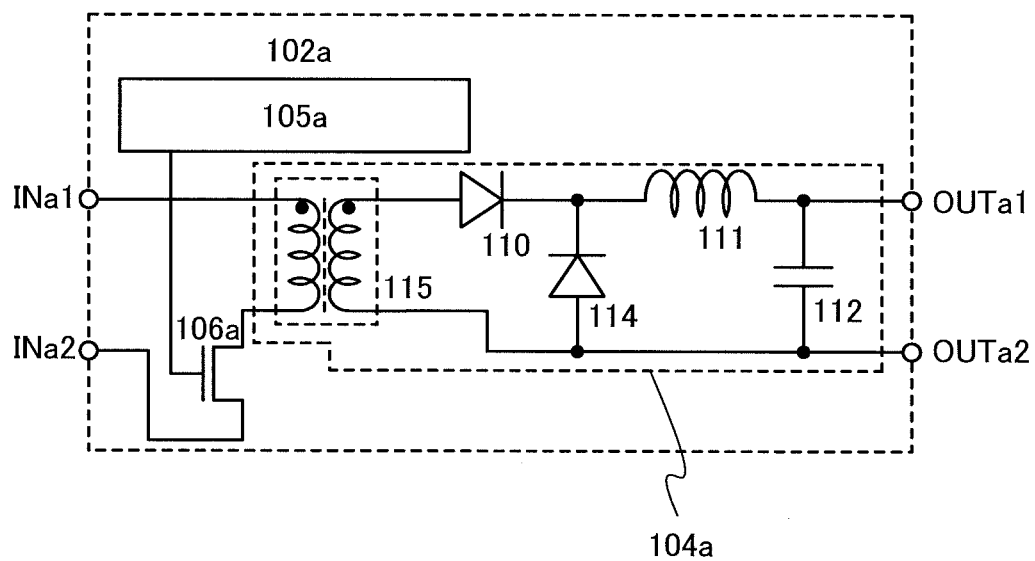

FIG. 9B illustrates a configuration of the first forward DC-DC converter 102a, as an example. The first DC-DC converter 102a in FIG. 9B includes the transistor 106a functioning as a switching element, the first voltage conversion portion 104a, and the first control circuit 105a.

In the first DC-DC converter 102a in FIG. 9B, the first voltage conversion portion 104a includes the diode 110, a diode 114, the coil 111, the capacitor 112, and a transformer 115. The first DC-DC converter 102a in FIG. 9B includes the input terminal INa1 supplied with the input voltage, the input terminal INa2 supplied with the fixed voltage, the output terminal OUTa1, and the output terminal OUTa2.

Like the transformer 113 in FIG. 9A, the transformer 115 includes a first coil and a second coil in which a common core is provided for each of the centers of the coils. Note that in the transformer 113, the start end of the first coil and the start end of the second coil are on the opposite side to each other; on the other hand, the start end of the first coil and the start end of the second coil are on the same side in the transformer 115.

The transistor 106a controls connection between the input terminal INa2 and one of terminals of the first coil of the transformer 115. Specifically, a first terminal of the transistor 106a is connected to the input terminal INa2, and a second terminal of the transistor 106a is connected to the one of the terminals of the first coil of the transformer 115. The other of the terminals of the first coil of the transformer 115 is connected to the input terminal INa1.

One of terminals of the second coil of the transformer 115 is connected to the anode of the diode 110 and the other of the terminals of the second coil is connected to the output terminal OUTa2. The cathode of the diode 110 is connected to a cathode of the diode 114 and the one of the terminals of the coil 111. An anode of the diode 114 is connected to the output terminal OUTa2. The other of the terminals of the coil 111 is connected to the output terminal OUTa1. One of electrodes of the capacitor 112 is connected to the output terminal OUTa1 and the other of the electrodes of the capacitor 112 is connected to the output terminal OUTa2.

Note that in this embodiment, the configurations of the first fly-back DC-DC converter 102a and the first forward DC-DC converter 102a are illustrated; however, the first DC-DC converter 102a and the second DC-DC converter 102b according to an embodiment of the present invention are not limited thereto. The photoelectric conversion device according to an embodiment of the present invention may include any DC-DC converter as long as it is a switching DC-DC converter which can adjust the level of output voltage by the duty ratio of switching of a switching element.

This embodiment can be implemented by being combined as appropriate with any of the above-described embodiments.
(Embodiment 4)

In this embodiment, an example of the photoelectric conversion device according to an embodiment of the present invention, which outputs AC voltage, is described.

A photoelectric conversion device in FIG. 11 includes, like the photoelectric conversion device in FIG. 1, the first photoelectric conversion element 101a, the second photoelectric conversion element 101b, the first DC-DC converter 102a, and the second DC-DC converter 102b. The photoelectric conversion device in FIG. 11 includes, unlike the photoelectric conversion device in FIG. 1, a first switch 151a, a first capacitor 152a, a second switch 151b, a second capacitor 152b, a pulse width modulation circuit 153, an inverter 154, and a band pass filter 155.

In the photoelectric conversion device in FIG. 11, as in the photoelectric conversion device in FIG. 1, the first DC-DC converter 102a includes the first switching element 103a, the first voltage conversion portion 104a, and the first control circuit 105a. The second DC-DC converter 102b includes the second switching element 103b, the second voltage conversion portion 104b, and the second control circuit 105b.

In the photoelectric conversion device in FIG. 11, as in the photoelectric conversion device in FIG. 1, the output terminal of the first DC-DC converter 102a is connected to the output terminal of the second DC-DC converter 102b in parallel. That is to say, the output terminal OUTa1 is connected to the output terminal OUTb1, and the voltages of the output terminal OUTa1 and the output terminal OUTb1 are supplied to a circuit in the subsequent stage. In addition, the output terminal OUTa2 is connected to the output terminal OUTb2, and the voltages of the output terminal OUTa2 and the output terminal OUTb2 are supplied to the circuit in the subsequent stage.

In the photoelectric conversion device in FIG. 11, as in the photoelectric conversion device in FIG. 1, part of input power supplied to the first DC-DC converter 102a is supplied to the first control circuit 105a and the second control circuit 105b. The first control circuit 105a and the second control circuit 105b use the part of input power as drive electric power and operate.

Specifically, in the photoelectric conversion device in FIG. 11, electric power is generated when the first photoelectric conversion element 101a is irradiated with light. The voltage of the electric power is smoothed by the first capacitor 152a and is input to the first DC-DC converter 102a through the first switch 151a. Note that provision of the first capacitor 152a can prevent pulsed current generated by ON/OFF of the first switch 151a from flowing to the first photoelectric conversion element 101a. The electric power input to the first DC-DC converter 102a is output after the voltage of the electric power is adjusted by the first DC-DC converter 102a.

Similarly, in the photoelectric conversion device in FIG. 11, electric power is generated when the second photoelectric conversion element 101b is irradiated with light. The voltage of the electric power is smoothed by the second capacitor 152b and is input to the second DC-DC converter 102b through the second switch 151b. Note that provision of the second capacitor 152b can prevent pulsed current generated by ON/OFF of the second switch 151b from flowing to the second photoelectric conversion element 101b. The electric power input to the second DC-DC converter 102b is output after the voltage of the electric power is adjusted by the second DC-DC converter 102b.

The voltages output from the first DC-DC converter 102a and the second DC-DC converter 102b are DC voltages. The inverter 154 converts DC voltage output from the first DC-DC converter 102a and the second DC-DC converter 102b into AC voltage and outputs the AC voltage. FIG. 11 shows an example of a structure in which the inverter 354 includes four transistors 156 to 159 and four diodes 160 to 163.

Specifically, a first terminal of the transistor 156 is connected to the output terminal OUTa1 and the output terminal OUTb1, and a second terminal of the transistor 156 is connected to a first terminal of the transistor 157. A second terminal of the transistor 157 is connected to the output terminal OUTa2 and the output terminal OUTb2. A first terminal of the transistor 158 is connected to the output terminal OUTa1 and the output terminal OUTb1, and a second terminal of the transistor 158 is connected to a first terminal of the transistor 159. A second terminal of the transistor 159 is connected to the output terminal OUTa2 and the output terminal OUTb2. The diodes 160 to 163 are connected to the transistors 156 to 159 in parallel respectively. Specifically, the first terminals of the transistors 156 to 159 are connected to cathodes of the diodes 160 to 163, respectively. The second terminals of the transistors 156 to 159 are connected to anodes of the diodes 160 to 163, respectively.

Further, the pulse width modulation circuit 153 is supplied with DC voltages output from the first DC-DC converter 102*a* and the second DC-DC converter 102*b*. The pulse width modulation circuit 153 is driven by application of the voltage and generates signals for controlling switching of the transistors 156 to 159.

The transistors 156 to 159 perform switching in accordance with the signal from the pulse width modulation circuit 153, whereby AC voltage with a PWM waveform is output from a node in which the second terminal of the transistor 156 and the first terminal of the transistor 157 in the inverter 154 are connected and a node in which the second terminal of the transistor 158 and the first terminal of the transistor 159 in the inverter 154 are connected.

Then, a high-frequency component is removed from the AC voltage output from the inverter 154 by using the band pass filter 155, whereby AC voltage with a sine wave can be obtained.

This embodiment can be implemented by being combined as appropriate with any of the above-described embodiments.

EXAMPLE 1

The photoelectric conversion device according to an embodiment of the present invention is highly reliable in operation in a wide illuminance range. Therefore, the limitation on a place for using electronic devices is relaxed with the use of the photoelectric conversion device according to an embodiment of the present invention, so that customer convenience can be increased. In particular, customer convenience of portable electronic devices can dramatically be increased if the limitation on the place for using the electronic devices is relaxed by using the photoelectric conversion device according to an embodiment of the present invention.

The photoelectric conversion device according to an embodiment of the present invention can obtain high photoelectric conversion efficiency. Accordingly, electric power for driving the electronic devices can be ensured more easily by using the photoelectric conversion device according to an embodiment of the present invention; therefore, operational reliability of the electric devices can be enhanced. In particular, the case of a portable electronic appliance to which electric power cannot be easily supplied constantly, continuous use time becomes longer by using the photoelectric conversion device according to an embodiment of the present invention, which is an advantage.

The photoelectric conversion device according to an embodiment of the present invention can be used for display devices, laptops, or image reproducing devices provided with recording media (typically devices which reproduce the content of recording media such as DVDs (digital versatile disc) and have displays for displaying the reproduced images). Other than the above, as an electronic device which can use the photoelectric conversion device according to an embodiment of the present invention, mobile phones, portable game machines, portable information terminals, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given. FIGS. 12A to 12D illustrate specific examples of these electronic devices.

Figure 12A:
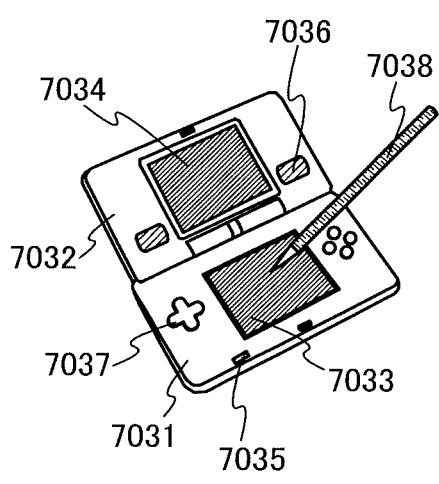
FIGS. 12A to 12D each illustrate an electronic device.

FIG. 12A illustrates a portable game machine, which includes a housing 7031, a housing 7032, a display portion 7033, a display portion 7034, a microphone 7035, a speaker 7036, an operation key 7037, a stylus 7038, and the like. The photoelectric conversion device according to an embodiment of the present invention can be used for an integrated circuit for controlling driving of the portable game machine. With the use of the photoelectric conversion device according to an embodiment of the present invention for the integrated circuit for controlling driving of the portable game machine, portable game machine with a high convenience and a high operational reliability can be provided. In addition, with the use of the photoelectric conversion device according to an embodiment of the present invention for a portable game machine, continuous operating time of the portable game machine can be longer. Although the portable game machine illustrated in FIG. 12A has the two display portions 7033 and 7034, the number of display portions included in the portable game machine is not limited to two.

Figure 12B:
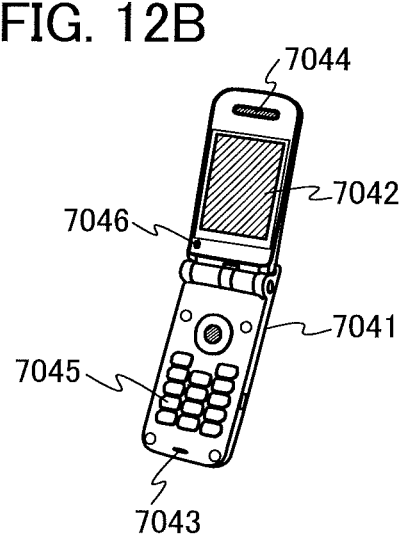

FIG. 12B is a mobile phone including a housing 7041, a display portion 7042, an audio input portion 7043, an audio output portion 7044, operation keys 7045, a light-receiving portion 7046, and the like. Light received in the light-receiving portion 7046 is converted into electrical signals, whereby external images can be loaded. With the use of the photoelectric conversion device according to an embodiment of the present invention for the integrated circuit for controlling driving of the mobile phone, a mobile phone with a high convenience and a high operational reliability can be provided. In addition, with the use of the photoelectric conversion device according to an embodiment of the present invention for a mobile phone, continuous operating time of the mobile phone can be longer.

Figure 12C:
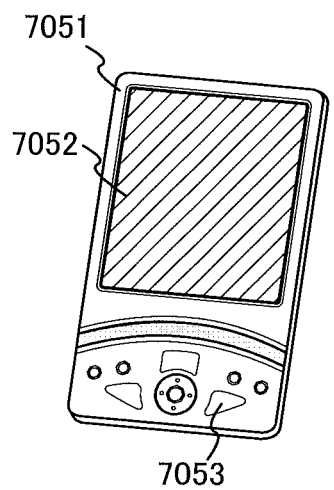

FIG. 12C is a portable information terminal including a housing 7051, a display portion 7052, operation keys 7053, and the like. A modem may be incorporated in the housing 7051 of the portable information terminal illustrated in FIG. 12C. The photoelectric conversion device according to an embodiment of the present invention can be used for an integration circuit for controlling driving of the portable information terminal. With the use of the photoelectric conversion device according to an embodiment of the present invention for the integrated circuit for controlling driving of the portable information terminal, a portable information terminal with a high convenience and a high operational reliability can be provided. In addition, with the use of the photoelectric conversion device according to an embodiment of the present invention for a portable information terminal, continuous operating time of the portable information terminal can be longer.

Figure 12D:
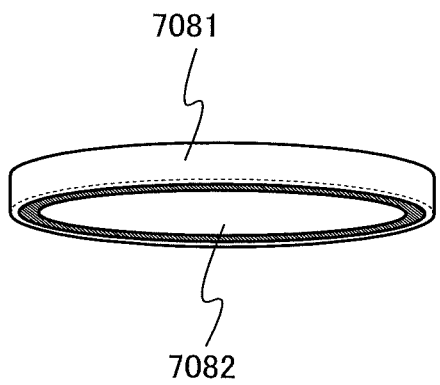

FIG. 12D is a lighting device including a housing 7081, a light source 7082, and the like. The light source 7082 includes a light-emitting element. The photoelectric conversion device according to an embodiment of the present invention can be used for an integration circuit for controlling driving of the lighting device. With the use of the photoelectric conversion device according to an embodiment of the present invention for the integrated circuit for controlling driving of the lighting device, a lighting device with a high convenience and a high operational reliability can be provided. In addition, with the use of the photoelectric conversion device according to an embodiment of the present invention for a lighting device, continuous operating time of the lighting device can be longer.

This embodiment can be implemented by being combined as appropriate with any of the above-described embodiments.

This application is based on Japanese Patent Application serial no. 2010-243017 filed with Japan Patent Office on Oct. 29, 2010, the entire contents of which are hereby incorporated by reference.

What is claimed is:

1. A photoelectric conversion device comprising:
a first photoelectric conversion element and a second photoelectric conversion element, stacked to overlap with each other in a light direction;
a first DC-DC converter which adjusts voltage of a first electric power generated in the first photoelectric conversion element and outputs the voltage; and
a second DC-DC converter which adjusts voltage of a second electric power generated in the second photoelectric conversion element and outputs the voltage,
an inverter which converts the first DC voltage and the second DC voltage and output a first AC voltage; and
a band pass filter which converts the first AC voltage and output a second AC voltage,
wherein a photoelectric conversion efficiency of the first photoelectric conversion element is higher than a photoelectric conversion efficiency of the second photoelectric conversion element under an environment having first illuminance,
wherein the photoelectric conversion efficiency of the second photoelectric conversion element is higher than the photoelectric conversion efficiency of the first photoelectric conversion element under an environment having second illuminance higher than the first illuminance, and
wherein part of the first electric power is used as drive electric power of the first DC-DC converter and drive electric power of the second DC-DC converter.

2. The photoelectric conversion device according to claim 1, wherein the first illuminance is higher than or equal to 100 lux and lower than or equal to 1000 lux.

3. The photoelectric conversion device according to claim 1, wherein the second illuminance is higher than or equal to 10000 lux and lower than or equal to 150000 lux.

4. The photoelectric conversion device according to claim 1, wherein the first illuminance is obtained by using a fluorescent lamp.

5. The photoelectric conversion device according to claim 1, wherein the second illuminance is obtained by using sunlight.

6. The photoelectric conversion device according to claim 1, wherein output terminals of the first DC-DC converter are connected to output terminals of the second DC-DC converter in series.

7. The photoelectric conversion device according to claim 1, wherein output terminals of the first DC-DC converter are connected to output terminals of the second DC-DC converter in parallel.

8. A photoelectric conversion device comprising:
a first photoelectric conversion element and a second photoelectric conversion element, stacked to overlap with each other in a light direction;
a first DC-DC converter which adjusts voltage of a first electric power generated in the first photoelectric conversion element and outputs a first DC voltage;
a second DC-DC converter which adjusts voltage of a second electric power generated in the second photoelectric conversion element and outputs a second DC voltage;
an inverter which converts the first DC voltage and the second DC voltage and outputs a first AC voltage; and
a band pass filter which converts the first AC voltage and outputs a second AC voltage,
wherein each of the first DC-DC converter and the second DC-DC converter comprises:
a control circuit;
a switching element performing switching in accordance with a signal output from the control circuit; and
a voltage conversion portion configured to adjust the voltage in accordance with switching of the switching element,
wherein a photoelectric conversion efficiency of the first photoelectric conversion element is higher than a photoelectric conversion efficiency of the second photoelectric conversion element under an environment having first illuminance,
wherein the photoelectric conversion efficiency of the second photoelectric conversion element is higher than the photoelectric conversion efficiency of the first photoelectric conversion element under an environment having second illuminance higher than the first illuminance, and
wherein part of the first electric power is transmitted to the control circuit of the first DC-DC converter and the control circuit of the second DC-DC converter.

9. The photoelectric conversion device according to claim 8, wherein the first illuminance is higher than or equal to 100 lux and lower than or equal to 1000 lux.

10. The photoelectric conversion device according to claim 8, wherein the second illuminance is higher than or equal to 10000 lux and lower than or equal to 150000 lux.

11. The photoelectric conversion device according to claim 8, wherein the first illuminance is obtained by using a fluorescent lamp.

12. The photoelectric conversion device according to claim 8, wherein the second illuminance is obtained by using sunlight.

13. The photoelectric conversion device according to claim 8, wherein output terminals of the first DC-DC converter are connected to output terminals of the second DC-DC converter in series.

14. The photoelectric conversion device according to claim 8, wherein output terminals of the first DC-DC converter are connected to output terminals of the second DC-DC converter in parallel.

15. The photoelectric conversion device according to claim 1, wherein the first photoelectric conversion element includes a first layer including amorphous silicon and the second photoelectric conversion element includes a second layer including single crystal silicon.

16. The photoelectric conversion device according to claim 8, wherein the first photoelectric conversion element includes a first layer including amorphous silicon and the second photoelectric conversion element includes a second layer including single crystal silicon.

17. A photoelectric conversion device comprising:
a first photoelectric conversion element including a first pair of electrodes and a first photoelectric conversion layer between the first pair of electrodes, and a second photoelectric conversion element including a second pair of electrodes and a second photoelectric conversion layer between the second pair of electrodes, stacked to overlap with each other in a light direction;
a first DC-DC converter which adjusts voltage of a first electric power generated in the first photoelectric conversion element and outputs a first DC voltage;

a second DC-DC converter which adjusts voltage of a second electric power generated in the second photoelectric conversion element and outputs a second DC voltage;

an inverter which converts the first DC voltage and the second DC voltage and outputs a first AC voltage; and a band pass filter which converts the first AC voltage and outputs a second AC voltage, wherein a photoelectric conversion efficiency of the first photoelectric conversion element is higher than a photoelectric conversion efficiency of the second photoelectric conversion element under an environment having first illuminance, wherein the photoelectric conversion efficiency of the second photoelectric conversion element is higher than the photoelectric conversion efficiency of the first photoelectric conversion element under an environment having second illuminance higher than the first illuminance, and wherein part of the first electric power is used as drive electric power of the first DC-DC converter and drive electric power of the second DC-DC converter.

18. The photoelectric conversion device according to claim 17, wherein the first illuminance is higher than or equal to 100 lux and lower than or equal to 1000 lux.

19. The photoelectric conversion device according to claim 17, wherein the second illuminance is higher than or equal to 10000 lux and lower than or equal to 150000 lux.

20. The photoelectric conversion device according to claim 17, wherein the first illuminance is obtained by using a fluorescent lamp.

21. The photoelectric conversion device according to claim 17, wherein the second illuminance is obtained by using sunlight.

22. The photoelectric conversion device according to claim 17, wherein the first pair of electrodes is connected to the second pair of electrodes in series.

23. The photoelectric conversion device according to claim 17, wherein the first pair of electrodes is connected to the second pair of electrodes in parallel.

24. The photoelectric conversion device according to claim 17, wherein the first photoelectric conversion layer includes amorphous silicon and the second photoelectric conversion layer includes single crystal silicon.

25. The photoelectric conversion device according to claim 1, further comprises:
a first switch between the first photoelectric conversion element and the first DC-DC converter; and
a second switch between the second photoelectric conversion element and the second DC-DC converter.

26. The photoelectric conversion device according to claim 1, further comprises:
a first capacitor between the first photoelectric conversion element and the first DC-DC converter; and
a second capacitor between the second photoelectric conversion element and the second DC-DC converter.

27. The photoelectric conversion device according to claim 1, further comprises a pulse width modulation circuit between the inverter and at least one of the first DC-DC converter and the second DC-DC converter.

28. The photoelectric conversion device according to claim 8, further comprises:
a first switch between the first photoelectric conversion element and the first DC-DC converter; and
a second switch between the second photoelectric conversion element and the second DC-DC converter.

29. The photoelectric conversion device according to claim 8, further comprises:
a first capacitor between the first photoelectric conversion element and the first DC-DC converter; and
a second capacitor between the second photoelectric conversion element and the second DC-DC converter.

30. The photoelectric conversion device according to claim 8, further comprises a pulse width modulation circuit between the inverter and at least one of the first DC-DC converter and the second DC-DC converter.

31. The photoelectric conversion device according to claim 17, further comprises:
a first switch between the first photoelectric conversion element and the first DC-DC converter; and
a second switch between the second photoelectric conversion element and the second DC-DC converter.

32. The photoelectric conversion device according to claim 17, further comprises:
a first capacitor between the first photoelectric conversion element and the first DC-DC converter; and
a second capacitor between the second photoelectric conversion element and the second DC-DC converter.

33. The photoelectric conversion device according to claim 17, further comprises a pulse width modulation circuit between the inverter and at least one of the first DC-DC converter and the second DC-DC converter.

34. The photoelectric conversion device according to claim 1, wherein the inverter includes four transistors and four diodes.

35. The photoelectric conversion device according to claim 8, wherein the inverter includes four transistors and four diodes.

36. The photoelectric conversion device according to claim 17, wherein the inverter includes four transistors and four diodes.

37. The photoelectric conversion device according to claim 1, wherein directions of forward biases of a first photoelectric conversion layer included in the first photoelectric conversion element and a second photoelectric conversion layer included in the second photoelectric conversion element are same.

38. The photoelectric conversion device according to claim 1, wherein the first AC voltage is an AC voltage with a PWM waveform.

39. The photoelectric conversion device according to claim 1, wherein the second AC voltage is an AC voltage with a sine wave.

40. The photoelectric conversion device according to claim 8, wherein directions of forward biases of a first photoelectric conversion layer included in the first photoelectric conversion element and a second photoelectric conversion layer included in the second photoelectric conversion element are same.

41. The photoelectric conversion device according to claim 8, wherein the first AC voltage is an AC voltage with a PWM waveform.

42. The photoelectric conversion device according to claim 8, wherein the second AC voltage is an AC voltage with a sine wave.

43. The photoelectric conversion device according to claim 17, wherein directions of forward biases of the first photoelectric conversion layer and the second photoelectric conversion layer are same.

44. The photoelectric conversion device according to claim 17, wherein the first AC voltage is an AC voltage with a PWM waveform.

45. The photoelectric conversion device according to claim 17, wherein the second AC voltage is an AC voltage with a sine wave.

\* \* \* \* \*